United States Patent
Kim et al.

(10) Patent No.: US 10,306,688 B2
(45) Date of Patent: May 28, 2019

(54) METHOD AND C DEVICE FOR PERFORMING MMTEL SERVICE

(71) Applicant: LG ELECTRONICS INC., Seoul (KR)

(72) Inventors: Jaehyun Kim, Seoul (KR); Youngdae Lee, Seoul (KR); Taehun Kim, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/554,416

(22) PCT Filed: Mar. 21, 2016

(86) PCT No.: PCT/KR2016/002795
§ 371 (c)(1),
(2) Date: Aug. 29, 2017

(87) PCT Pub. No.: WO2016/153237
PCT Pub. Date: Sep. 29, 2016

(65) Prior Publication Data
US 2018/0049258 A1    Feb. 15, 2018

Related U.S. Application Data

(60) Provisional application No. 62/137,237, filed on Mar. 24, 2015.

(51) Int. Cl.
*H04W 76/14* (2018.01)
*H04W 76/10* (2018.01)
(Continued)

(52) U.S. Cl.
CPC ............. *H04W 76/14* (2018.02); *H04W 4/70* (2018.02); *H04W 48/02* (2013.01);
(Continued)

(58) Field of Classification Search
CPC ..... H04W 48/02; H04W 48/17; H04W 28/02; H04W 4/70; H04W 76/10; H04W 76/14; H04W 76/27
See application file for complete search history.

(56) References Cited

U.S. PATENT DOCUMENTS

2012/0244853 A1* 9/2012 Iwamura ............... H04W 48/02
                                                          455/422.1
2013/0044702 A1   2/2013 Jayaraman et al.
(Continued)

OTHER PUBLICATIONS

PCT International Application No. PCT/KR2016/002795, International Search Report dated Jun. 24, 2016, 2 pages.
(Continued)

*Primary Examiner* — Mewale A Ambaye
(74) *Attorney, Agent, or Firm* — Lee Hong Degerman Kang Waimey

(57) ABSTRACT

One disclosure of the present specification provides a method for performing a multimedia telephony (MMTEL) service in a machine type communication (MTC) device. The method can comprise the steps of: receiving, from an upper layer, an indication in which a mobile orienting (MO) MMTEL service is initiated; setting a special call type for the MMTEL service in a call type field within a request message for performing the MMTEL service; and transmitting the request message to a lower layer, wherein, when the request message is transmitted to the lower layer, if the MMTEL service is initiated, the MTC device does not transmit an extended access barring (EAB) application indication to the lower layer or can transmit, to the lower layer, an indication commanding the EAB to be skipped, even if the EAB is set.

18 Claims, 23 Drawing Sheets

(51) Int. Cl.
    *H04W 48/02*    (2009.01)
    *H04W 4/70*     (2018.01)
    *H04W 76/27*    (2018.01)
    *H04W 72/04*    (2009.01)
    *H04W 48/00*    (2009.01)
    *H04W 88/10*    (2009.01)

(52) U.S. Cl.
    CPC ....... *H04W 72/0406* (2013.01); *H04W 76/10* (2018.02); *H04W 76/27* (2018.02); *H04W 48/17* (2013.01); *H04W 72/0446* (2013.01); *H04W 88/10* (2013.01)

(56) References Cited

U.S. PATENT DOCUMENTS

2014/0307720 A1    10/2014  Koslela et al.
2016/0345314 A1*   11/2016  Webb .................. H04W 4/70
2017/0374644 A1*   12/2017  Ryu ................... H04W 76/11

OTHER PUBLICATIONS

Intel Corporations, "Discussion on the specification impacts due to requirements to prioritize MMTEL voice, MMTEL video and SMS", R2-140493, 3GPP TSG RAN WG2 Meeting #85, Feb. 2014, 7 pages.

Intel Corporation et al., "Continuation of EAB override for requests on a PDN connection established with EAB override", C1-141000, 3GPP TSG-C1-141000, 3GPP TSG-CT WG1 Meeting #86, Jan. 2014, 5 pages.

* cited by examiner

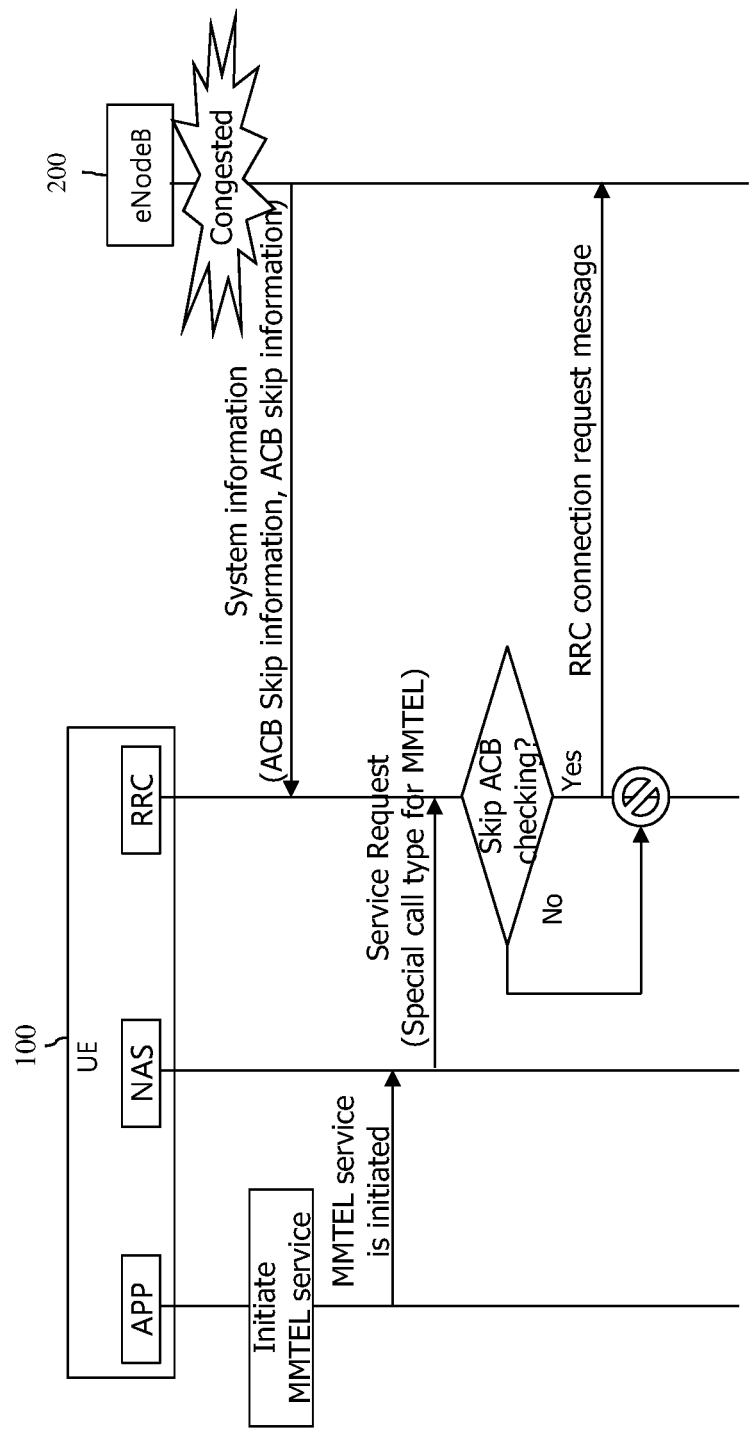

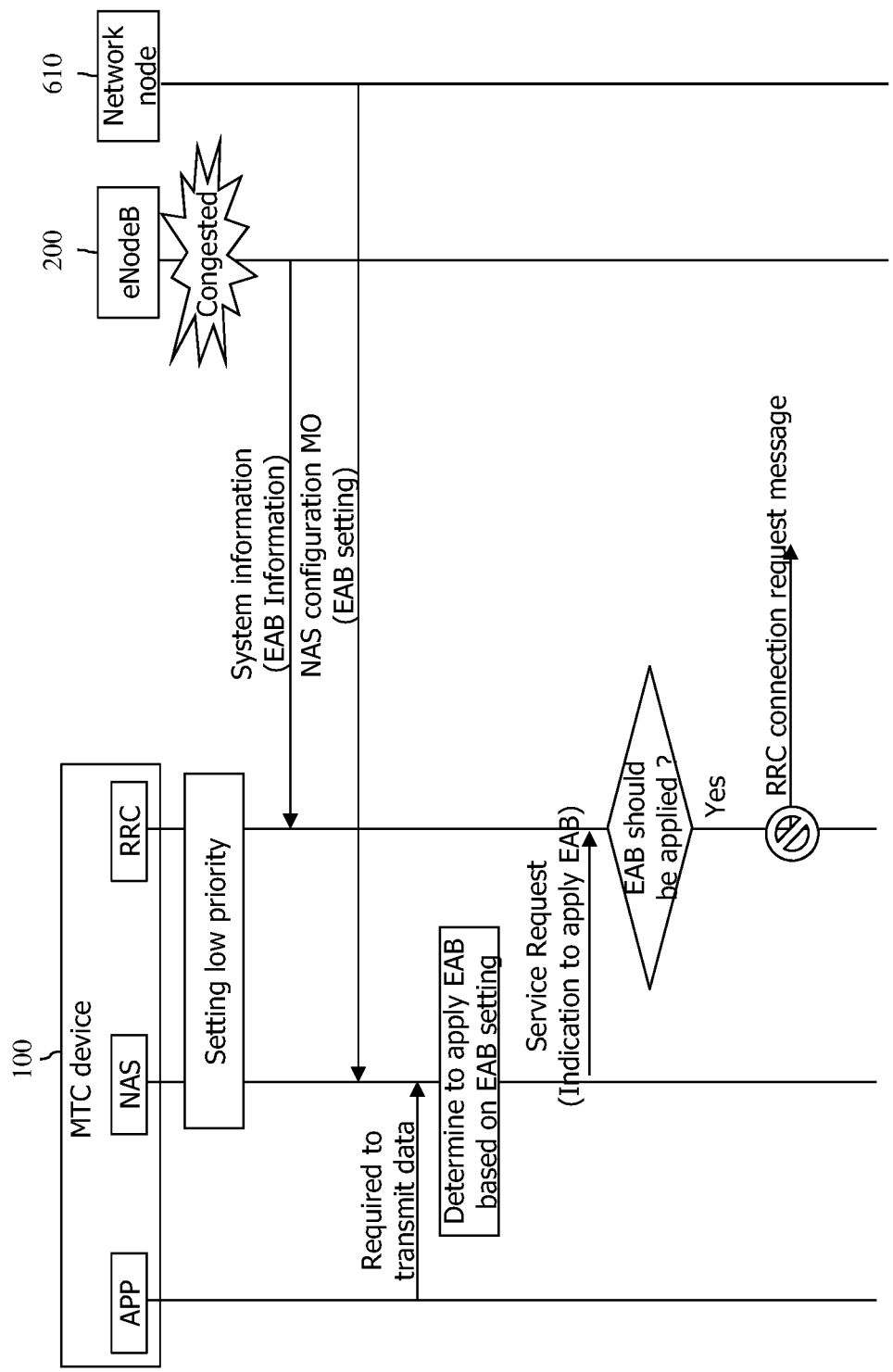

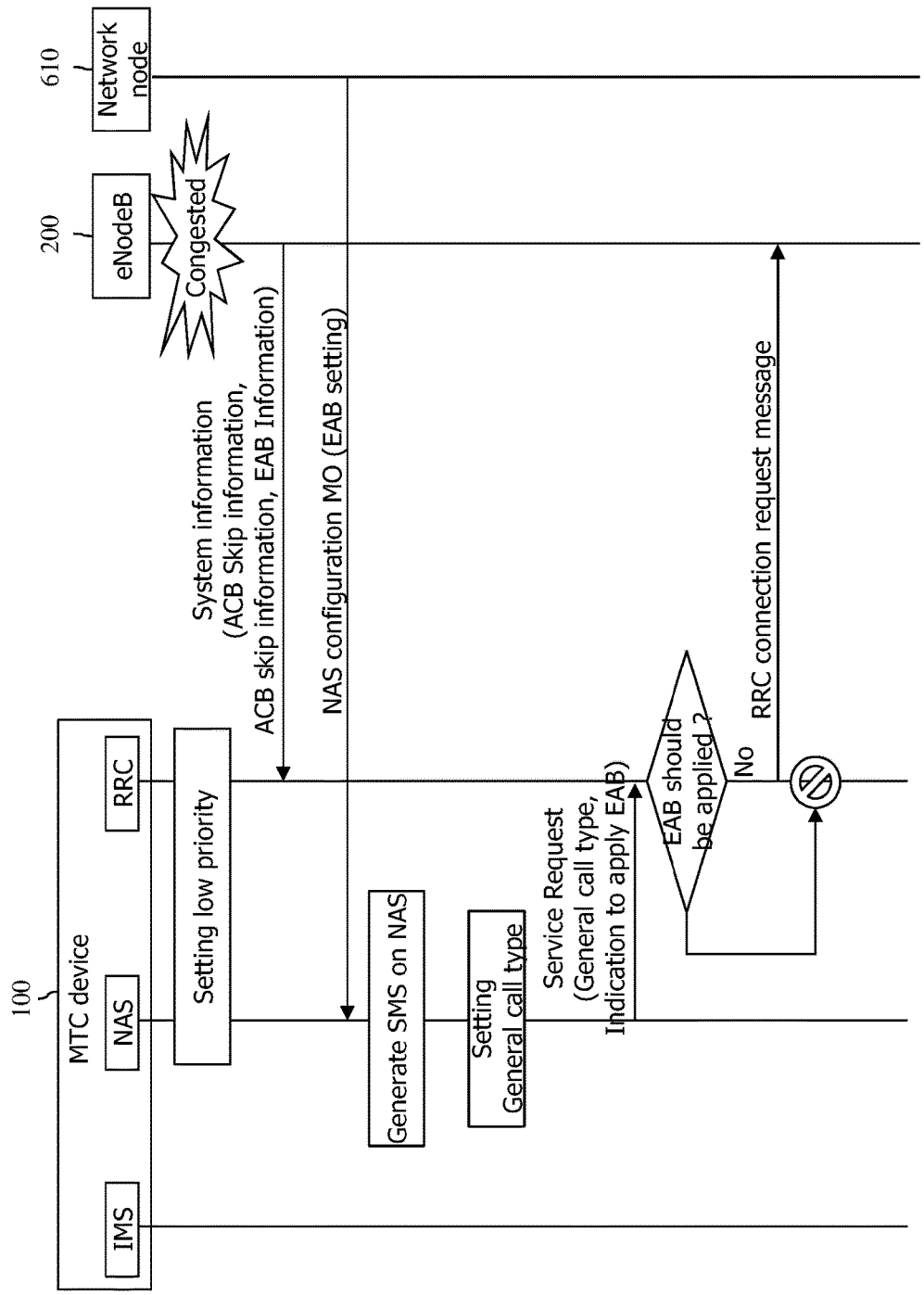

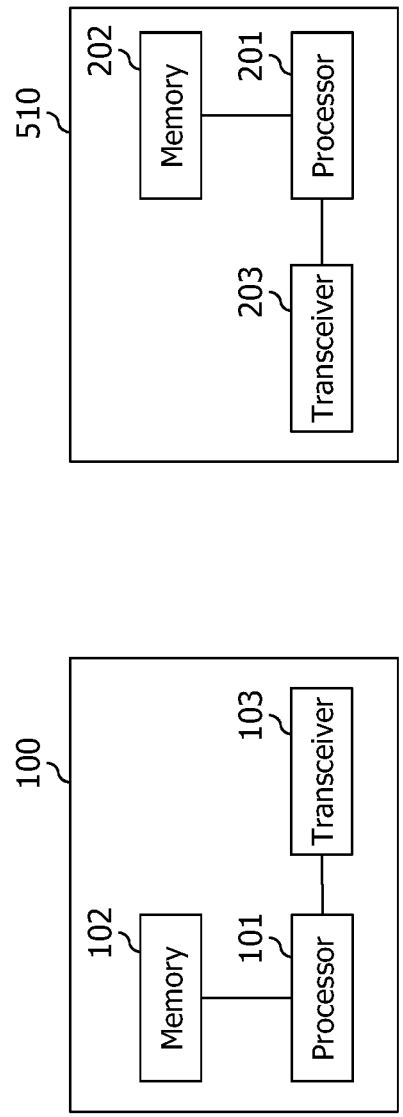

METHOD AND MTC DEVICE FOR PERFORMING MMTEL SERVICE

CROSS-REFERENCE TO RELATED APPLICATIONS

This application is the National Stage filing under 35 U.S.C. 371 of International Application No. PCT/KR2016/002795, filed on Mar. 21, 2016, which claims the benefit of U.S. Provisional Application No. 62/137,237, filed on Mar. 24, 2015, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in an upper layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, an upper layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from an upper layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, in order to solve a network overload problem, an eNodeB may broadcast information related to access class barring (ACB). Through the ACB, the UE may check whether an RRC connection request of its own is a barring target based on the ACB, and when the RRC connection request of the UE is not a barring target, the UE may transmit the RRC connection request.

However, network congestion may be aggravated due to an introduction of a machine type communication (MTC) device. In order to solve this, the eNodeB may broadcast extended assess barring (EAB)-related information. The MTC device may check whether an RRC connection request of its own is a barring target based on EAB, and only when the RRC connection request is not a barring target, the MTC device may transmit the RRC connection request.

Meanwhile, a multimedia telephony (MMTEL) service has recently emerged. Through the MMTEL service, multimedia data such as voice, real-time video, text, file transmission, and the like, may be transmitted and received.

However, when the MTC device wants to perform the MMTEL service, it is technically obscure as to whether the MTC device should perform both or only any one of the ACB checking and the EAB checking.

SUMMARY OF THE INVENTION

Accordingly, an object of the present invention is to present a method that can solve the aforementioned problem.

In an aspect, a method for performing a multimedia telephony (MMTEL) service in a machine type communication (MTC) device is provided. The method includes: receiving an indication indicating that a mobile orienting (MO) MMTEL service has initiated from an upper layer; setting a special call type for the MMTEL service in a call type field within a request message for performing the MMTEL service; and delivering the request message to a lower layer. Here, when the request message is delivered to the lower layer, although extended access barring (EAB) has been configured (or set) for the MTC device, if the MMTEL service is initiated, an indication to apply EAB is not delivered to the lower layer or an indication indicating that the EAB should be skipped is delivered to the lower layer.

The method may further include: receiving, from a base station (BS), a management object (MO) including information indicating that the EAB should be set.

The method may further include: receiving, by the lower layer, a system information block (SIB) including one or more of information regarding the EAB, access class barring (ACB) information, and ACB skip information, from the BS.

The method may further include: when the lower layer receives the request message having the special call type without the indication to apply EAB, not performing EAB checking on the request message; or when the lower layer receives the request message having the special call type and an indication indicating that the EAB should be skipped, skipping EAB checking on the request message.

The method may further include: after the EAB checking is not performed or after the EAB checking is skipped, determining whether to skip ACB checking on the request message on the basis of the special call type and the ACB skip information.

In another aspect, a method for performing a multimedia telephony (MMTEL) service in a machine type communication (MTC) device is provided. The method includes: receiving, from a base station (BS), a system information block including one or more of information regarding extended access barring (EAB), access class barring (ACB) information, and ACB skip information; obtaining, from an upper layer, a request message including a call type field set to a special call type for the MMTEL service and an indication to apply EAB; although the indication to apply EAB is obtained, if the call type field has been set to the special call type, ignoring the indication to apply EAB; and determining whether to skip ACB checking on the request message on the basis of the special call type and the ACB skip information.

The ignoring of the indication to apply EAB may include: not performing EAB checking on the request message.

The method may further include: when it is determined not to skip the ACB checking, performing ACB checking on the request message on the basis of the ACB information.

In another aspect, a machine type communication (MTC) device for performing a multimedia telephony (MMTEL) service is provided. The MTC device includes: a transceiver unit; and a processor controlling the transceiver unit and including an NAS layer and an RRC layer. The NAS layer performs: receiving, from an upper layer, an indication indicating that a mobile orienting (MO) MMTEL service has initiated; setting a special call type for the MMTEL service in a call type field within a request message for performing the MMTEL service; and delivering the request message to the RRC layer. Here, when the request message is delivered to the RRC layer, although the MTC device has been configured with extended access barring (EAB), the NAS layer may not deliver an indication to apply EAB to the RRC layer or deliver an indication indicating that the EAB should be skipped to the RRC layer.

In another aspect, a machine type communication (MTC) device for performing a multimedia telephony (MMTEL) service is provided. The MTC device includes: a transceiver unit; and a processor controlling the transceiver unit and including an NAS layer and an RRC layer. The RRC layer performs: receiving, from a base station (BS), a system information block including one or more of information regarding extended access barring (EAB), access class barring (ACB) information, and ACB skip information; obtaining, from the NAS layer, a request message including a call type field set to a special call type for the MMTEL service and an indication to apply EAB; although the indication to apply EAB is obtained, if the call type field has been set to the special call type, ignoring the indication to apply EAB; and determining whether to skip ACB checking on the request message on the basis of the special call type and the ACB skip information.

According to the present disclosure, the aforementioned problems of the related art may be solved.

BRIEF DESCRIPTION OF THE DRAWINGS

FIG. 7B illustrates an example of skipping ACB checking when an MMTEL service is performed in a network-congested state.

FIG. 9B illustrates an example of applying extended access barring (EAB) to resolve congestion caused by MTC devices.

FIGS. 11A and 11B are flow charts illustrating a proposal 1-1.

FIG. 15 is a block diagram illustrating a configuration of an MTC device and an eNode B according to an embodiment of the present invention.

DESCRIPTION OF EXEMPLARY EMBODIMENTS

Figure 1:
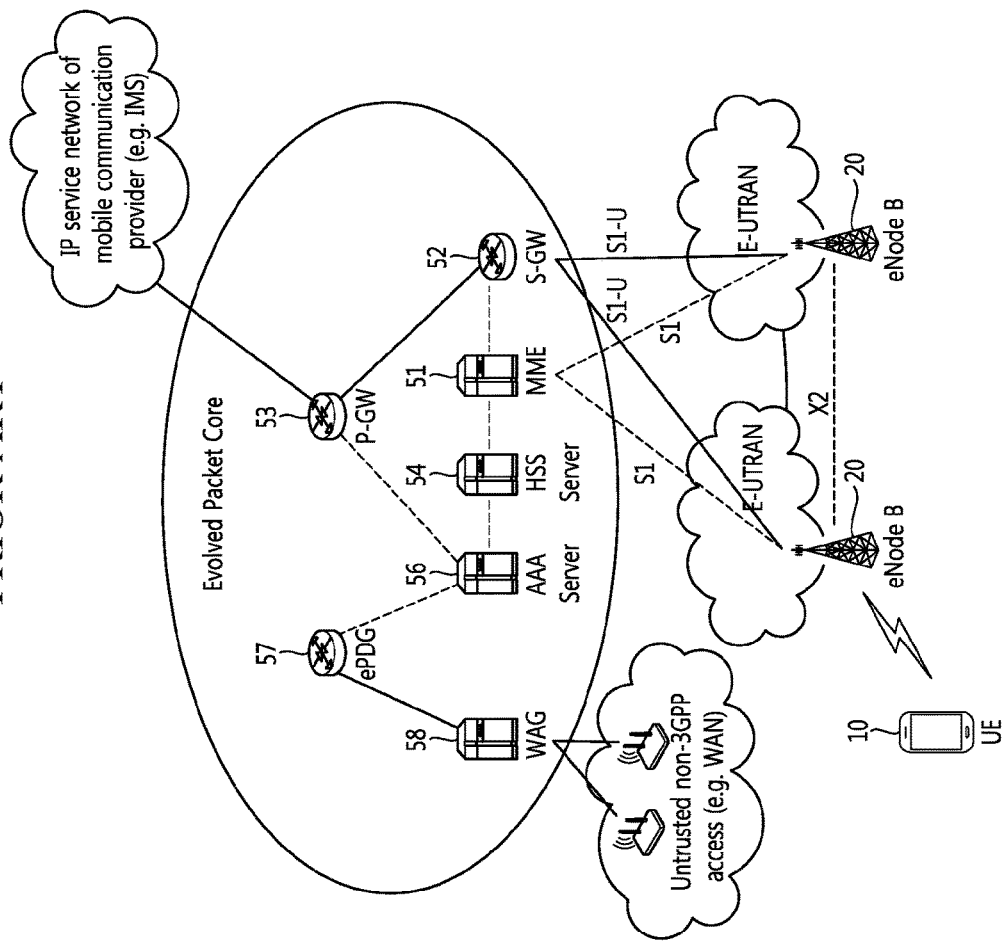
FIG. 1 is a structural diagram of an evolved mobile communication network.
Figure 2:
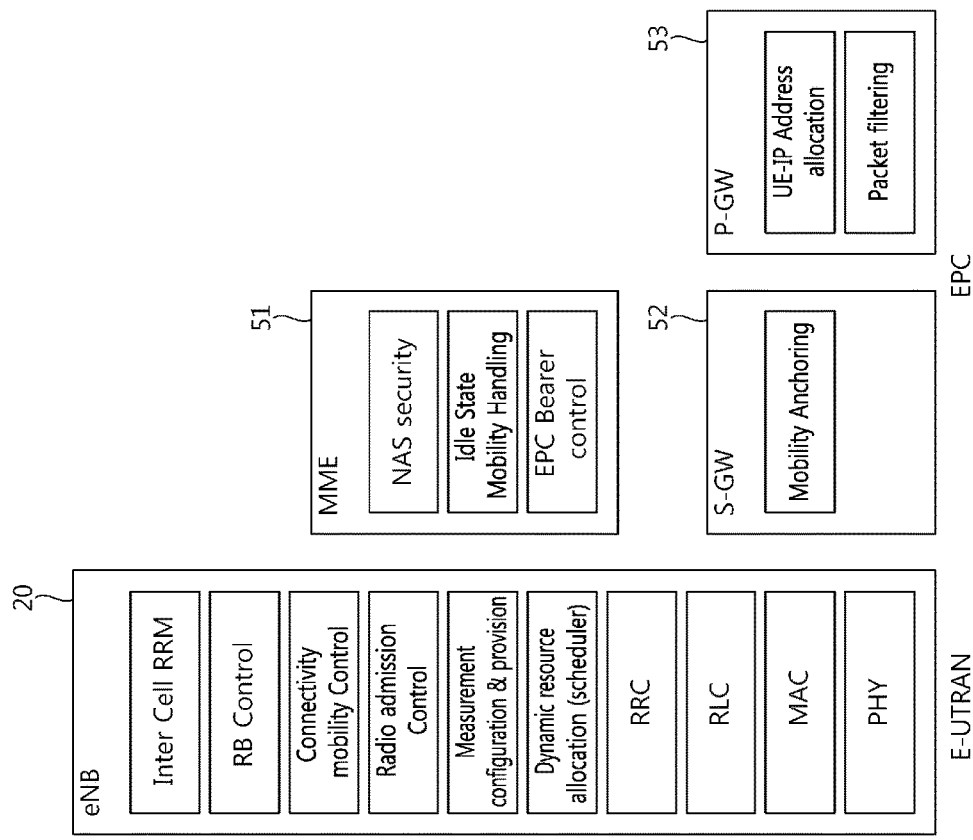
FIG. 2 is an exemplary diagram illustrating architectures of a general E-UTRAN and a general EPC.
Figure 3:
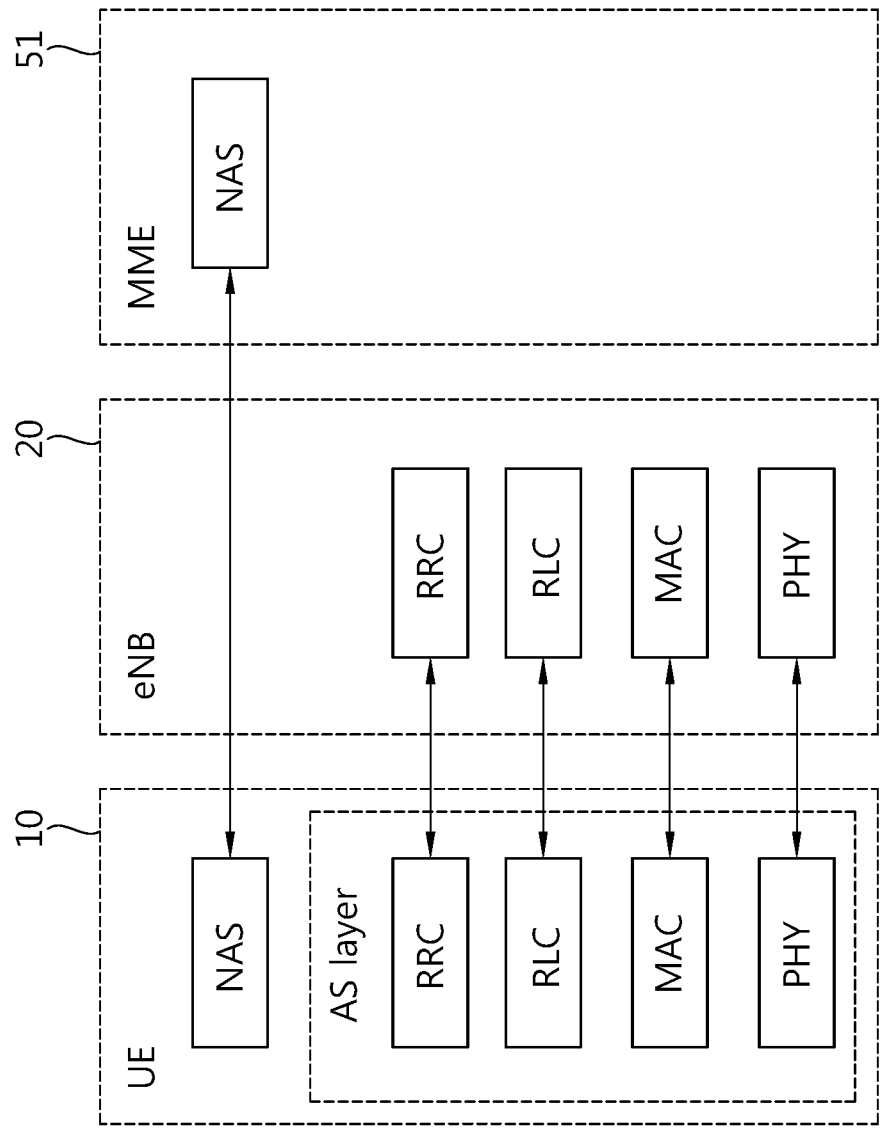
FIG. 3 is an exemplary diagram illustrating a structure of a radio interface protocol on a control plane between UE and eNodeB.
Figure 4:
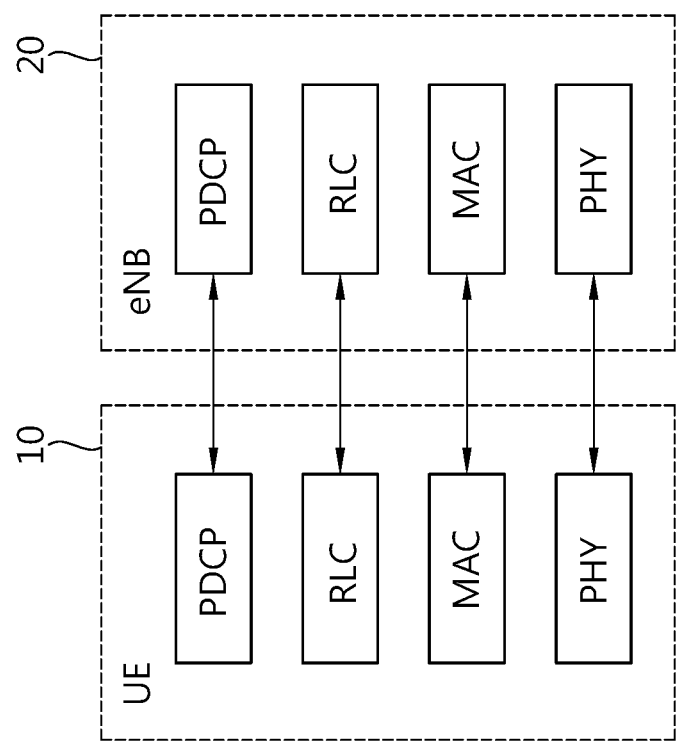
FIG. 4 is another exemplary diagram illustrating a structure of a radio interface protocol on a user plane between the UE and a base station.
Figure 5A:
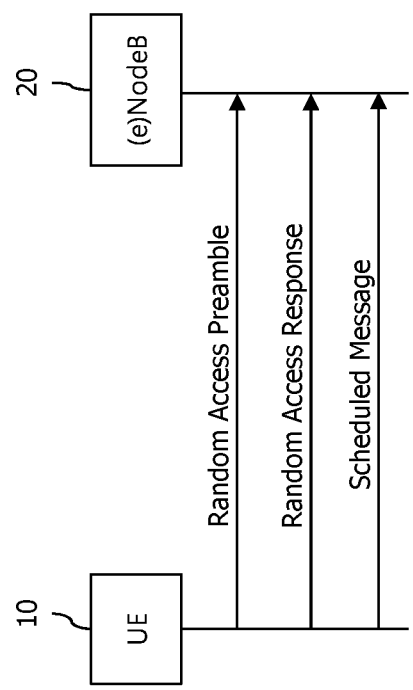
FIG. 5A is a flowchart illustrating a random access process in 3GPP LTE.
Figure 5B:
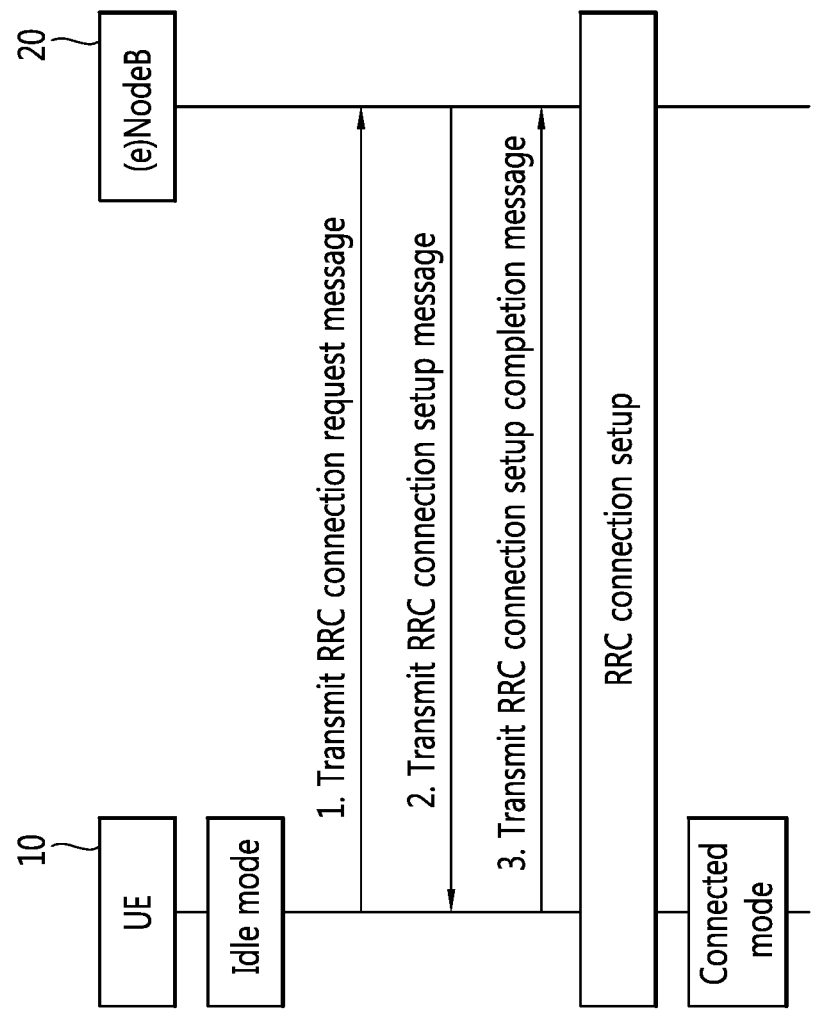
FIG. 5B illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signaling low priority. The standard document 3GPP TS 24.301 and TS 24.008 may be incorporated by reference for details thereof.

Normal priori UE: A normal UE not configured with low priority.

Dual priority UE: A UE configured for dual priority. That is, a UE which provides dual priority support is configured for a NAS signaling low priority and also configured to override the NAS signaling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

Hereinafter, an aspect of the present specification is described with reference to the accompanying drawings.

Figure 6:
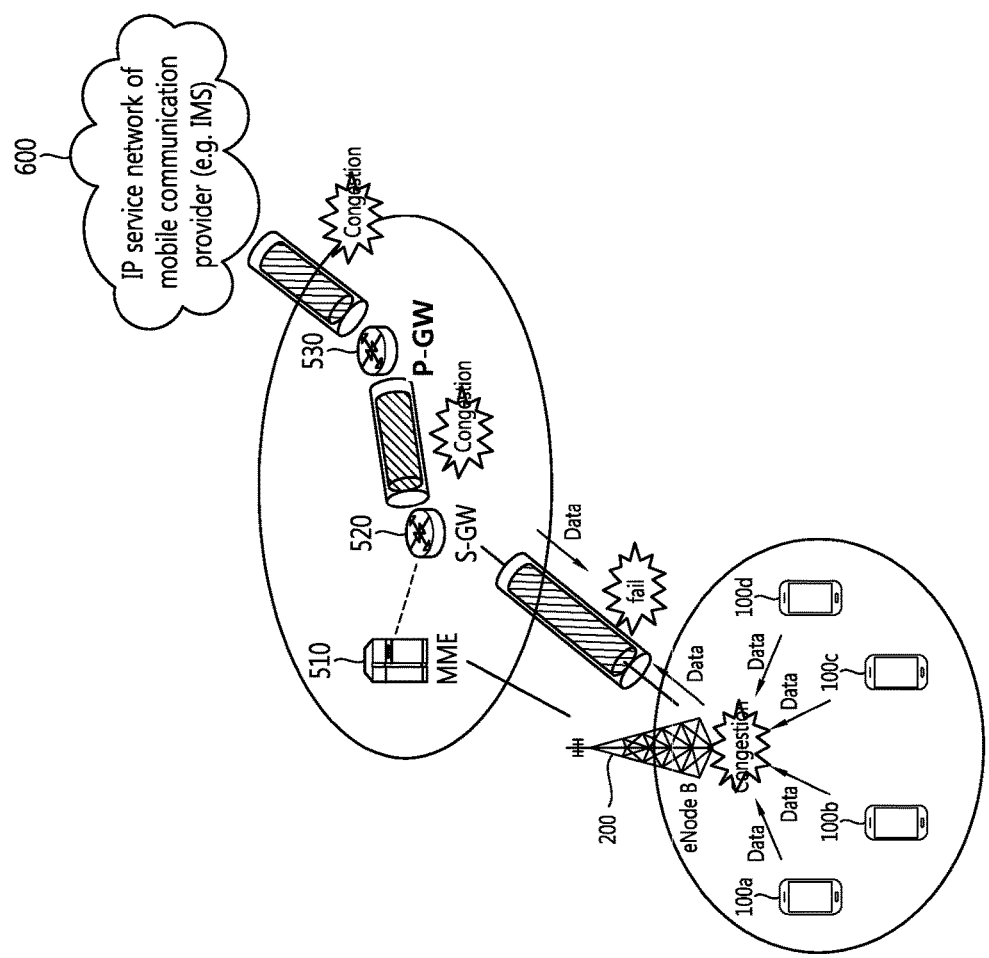
FIG. 6 illustrates a network overloaded state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7A:
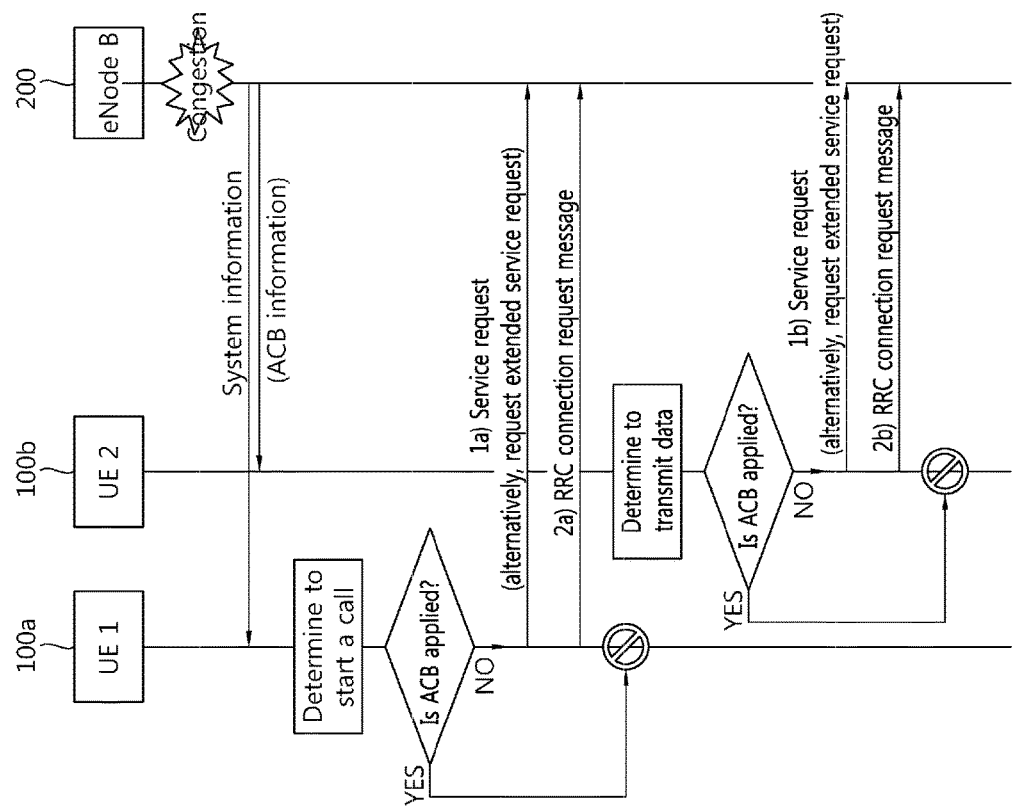
FIG. 7A is an exemplary flowchart illustrating an access barring operation in a network congested state.

FIG. 7a is an exemplary flowchart illustrating an access barring operation in a network congested state.

As illustrated in FIG. 7a, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
|---|---|
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signaling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100a determines an IMS service, for example, mobile orienting of a call by VoLTE and generates a service request message. Similarly, UE2 100b determines mobile orienting of general data and generate the service request message.

Sequentially, the UE1 100a generates an RRC connection request message. Similarly, the UE2 100b generate the RRC connection request message.

Meanwhile, the UE1 100a performs access barring check (that is, whether the ACB is applied). Similarly, the UE2 100b performs access barring check (that is, whether the ACB is applied).

If the ACB is not applied, the UE1 100a and the UE2 100b may transmit a service request (alternatively, an extended service request) message and the RRC connection request message, respectively. However, when the ACB is applied, both the UE1 100a and the UE2 100b may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100a and the UE2 100b. Then, the UE1 100a and the UE2 100b verify whether the access barring is applied, by using a barring factor included in the received ACB-related information, based on the stored access class. The access barring check is performed in each access stratum (AS) layer, that is, an RRC layer of the UE1 100a and the UE2 100b.

The access barring check will be described in more detail as follows.

The ac-BarringPerPLMN-List is included in the SIB type 2 received by each of the UE1 100a and the UE2 100b, and in the case where AC-BarringPerPLMN entry matched with plmn-identityIndex corresponding to the PLMN selected in an upper layer is included in the ac-BarringPerPLMN-List, AC-BarringPerPLMN entry matched with the plmn-identityIndex corresponding to the PLMN selected by the upper layer is selected.

Next, when the UE1 100a and the UE2 100b perform the RRC connection request, the access barring check is performed by using T303 as Tbarring and using ac-BarringForMO-Data as a barring parameter.

When the barring is determined, each AS(RRC) layer of the UE1 100a and the UE2 100b notifies a failure of the RRC connection establishment to the upper layer.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

<Multimedia Telephony (MMTEL)>

Recently, MMTEL has been actively researched. MMTEL, a global standard based on an IP multimedia subsystem (IMS), provides converged, fixed mobile real-time multimedia communication, whereby media capabilities such as voice, real-time video, text, file transmission, and the like, may be used and a photograph, audio, video clip, and the like, may be shared.

Currently, in a system environment supporting a 3GPP standard MMTEL-based service, in order to start an MMTEL voice, MMTEL image, and an SMS over IP service, a non-access stratum (NAS) layer of a UE sets a special call type, e.g., originating MMTEL voice, originating MMTEL video, originating SMSoIP, originating SMS (for SMS generated by the NAS layer) when starting a service request procedure.

FIG. 7B illustrates an example of skipping ACB checking when an MMTEL service is performed in a network-congested state.

As can be seen from FIG. 7B, in order to prevent an MMTEL-based (IMS-based) mobile originated (MO) service, e.g., MMTEL voice/MMTEL image/SMS over IP service, from being barred, the eNodeB includes ACB skip information in system information and transmits the same.

If an IMS layer among application layers of the UE 100 determines to start an MMTEL service, the IMS layer delivers an indication indicating start/setting of the MMTEL service to the NAS layer.

The NAS layer determines to perform a service request procedure or a TAU procedure on the basis of the indication. Here, the NAS layer sets a special call type for MMTEL in a service request message for the service request procedure or a TAU request message for the TAU procedure. For example, the NAS layer sets a call type as an originating MMTEL voice, originating MMTEL video, originating SMSoIP, originating SMS (for SMS generated in the NAS layer). Also, the NAS layer informs an RRC layer about an establishment cause of RRC connection. Here, the NAS layer sets the establishment cause to MO data or MO signaling for MMTEL.

The RRC layer determines to skip ACB checking on the basis of the ACB skip information and the call type obtained from the NAS layer. Thus, the RRC layer may be able to transmit an RRC connection request message.

Meanwhile, for general data, the NAS layer sets a general call type (e.g., originating call). In this case, the RRC layer applies ACB checking, rather than skipping it, on the basis of the ACB skip information and the call type obtained from the NAS layer, and accordingly, an RRC connection establishment procedure may be interrupted. In this manner, ACB checking may be performed only on a general mobile originating (MO) service, e.g., originating call, originating data, originating IMS voice, and originating IMS video of the UE.

<MTC (Machine Type Communication)>

MTC (Machine Type Communication) refers to communication performed between machines, excluding a human being, and a device used for MTC is called an MTC device. A service provided through the MTC device may be differentiated from a communication service involving a human being and may be applied to services of various categories.

Figure 8A:
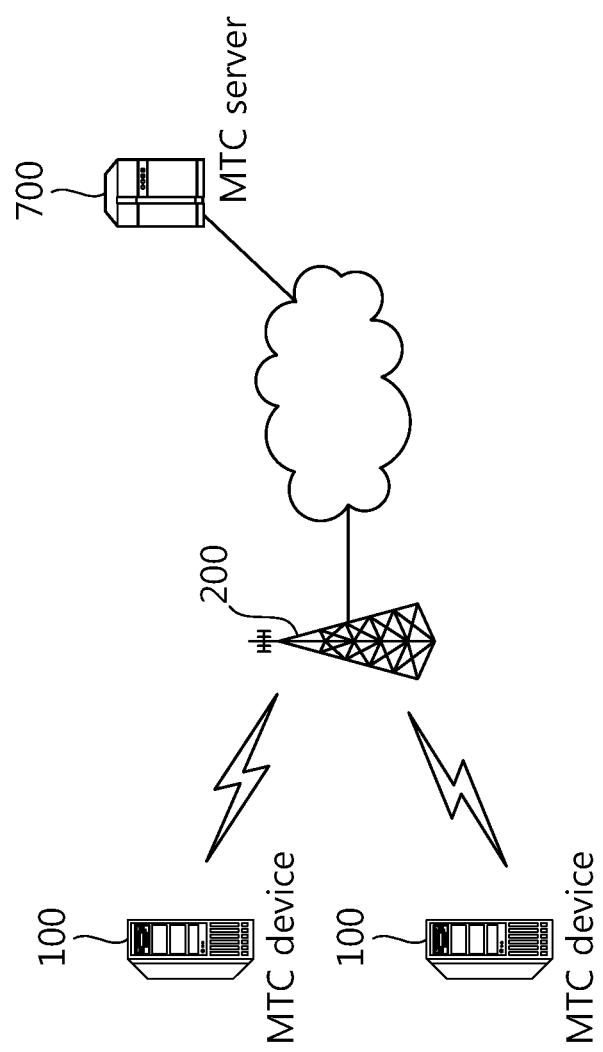
FIG. 8A illustrates an example of machine type communication (MTC).

FIG. 8A illustrates an example of MTC.

MTC refers to information exchange between MTC devices 100 through an eNodeB 200 or information exchange between an MTC device 100 and an MTC server 700 through the eNodeB 200, without human interaction.

The MTC server 700 is an entity communicating with the MTC device 100. The MTC server 700 executes an MTC application and provides an MTC-specific service to the MTC device 100.

The MTC device 100 is a wireless device providing MTC communication, which may be fixed or have mobility.

A service provided through MTC is differentiated from an existing service of communication involving a human being, and various categories of service such as tracking, metering, payment, a medical field service, remote control, and the like, are present. In detail, services provided through MTC may include checking an electric meter, measuring a water level, utilization of a surveillance camera, inventory report of a vending machine, etc.

Distinguishing characteristics of the MTC device lie in that a transfer data amount is small and uplink/downlink data transmission and reception occurs occasionally, and thus, it is effective to lower cost of the MTC device and reduce battery consumption according to such a low data rate. The MTC device features less mobility, and thus, a channel environment thereof is rarely changed.

Meanwhile, MTC is also called Internet of things (IoT). Thus, the MTC device may also be called an IoT device.

Figure 8B:
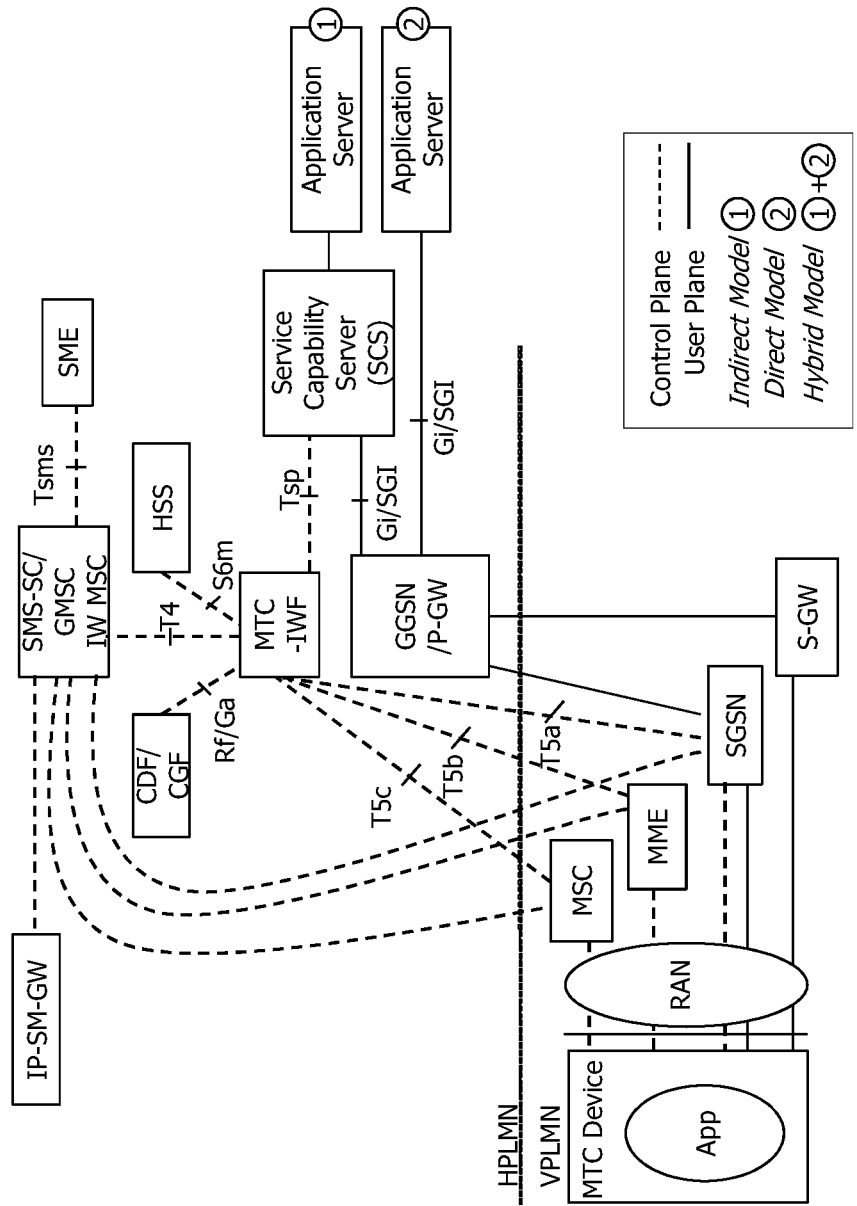
FIG. 8B is a conceptual view illustrating a 3GPP service model for supporting MTC.

FIG. 8B is a conceptual view illustrating a 3GPP service model for supporting MTC.

An end-to-end application between an MTC device (or an MTC terminal) and an MTC application may use services provided by a 3GPP system and selective services provided by an MTC server. The 3GPP system may provide transportation and communication services (including a 3GPP bearer service, IMS, and SMS) including various optimizations facilitating MTC. FIG. 8B illustrates that an MTC device is connected to a 3GPP network (a UTRAN, an E-UTRAN, a GERAN, an I-WLAN, etc.) through a Um/Uu/LTE-Uu interface. An architecture of FIG. 8B includes various MTC models (a direct model, an indirect model, and a hybrid model).

Entities illustrated in FIG. 8B will be described.

In FIG. 8B, an application server is a server on a network in which an MTC application is executed. Technologies for implementing various aforementioned MTC applications may be applied to the MTC application server and a detailed description thereof will be omitted. Also, in FIG. 8B, the MTC application server may access an MTC server through a reference point API and a detailed description thereof will be omitted. Or, the MTC application server may be collocated with an MTC server.

The MTC server (or an illustrated service capability server (SCS) may be a server on a network managing an MTC terminal and may be connected to a 3GPP network to communicate with an MTC device and nodes of a PLMN.

An MTC-interworking function (IWF) may control interworking between the MTC server and an operator core network and serve as a proxy of an MTC operation. In order to support an MTC indirect or hybrid model, one or more MTC-IWFs may be present within a home PLMN (HPLMN). The MTC-IWF may operate a specific function in a PLMN by relaying or interpreting a signaling protocol on a reference point Tsp. The MTC-IWF may perform various functions such as a function to authenticate the MTC server before the MTC server establishes communication with the 3GPP network, a function to authenticate a control plane request from the MTC server, and a function related to a trigger indication as described hereinafter.

An SMS-SC (Short Message Service-Service Center)/IP-SM-GW (Internet Protocol Short Message GateWay) may manage transmission and reception of a short message service (SMS). The SMS-SC may be in charge of a function to relay a short message between a short message entity (SME) (which transmits or receives a short message) and a mobile station and store and transfer the short message. An IP-SM-GW may be in charge of protocol interaction between an IP-based terminal and the SMS-SC.

A CDF (Charging Data Function)/CGF (Charging Gateway Function) may operate in relation to billing.

An HLR/HSS may store subscriber information (IMSI, etc.) routing information, configuration information, and the like, and provide the same to the MTC-IWF.

An MSC/SGSN/MME may perform a control function such as management of mobility of a UE for network connection, authentication, resource allocation, and the like. In relation to triggering described hereinafter, the MSC/SGSN/MME may serve to receive a trigger indication from the MTC-IWF and process the received trigger indication to a form of a message provided to an MTC terminal.

A GGSN (Gateway GPRS Support Node)/S-GW (Serving-Gateway)+P-GW (Packet Data Network-Gateway) may serve as a gateway in charge of connection between a core network and an external network.

Table 3 below shows major reference points of FIG. 8B.

TABLE 3

| Reference point | Description |
| --- | --- |
| Tsms | It is a reference point an entity outside the 3GPP system uses to communicate with UEs used for MTC via SMS. |
| Tsp | It is a reference point an entity outside the 3GPP system uses to communicate with the MTC-IWF related control plane signaling. |
| T4 | Reference point used by MTC-IWF to route device trigger to the SMS-SC in the HPLMN |
| T5a | Reference point used between MTC-IWF and serving SGSN |
| T5b | Reference point used between MTC-IWF and serving MME |
| T5c | Reference point used between MTC-IWF and serving MSC. |
| S6m | Reference point used by MTC-IWF to interrogate HSS/HLR for E.164 MSISDN or external Identifier mapping to IMSI and gather UE reachability and configuration information |

One or more reference points among T5a, T5b, and T5c will be referred to as T5.

Meanwhile, user plane communication with the MTC server in the case of indirect and hybrid models and communication with the MTC application server in the case of direct and hybrid models may be performed using an existing protocol through reference points Gi and SGi.

Figure 9A:
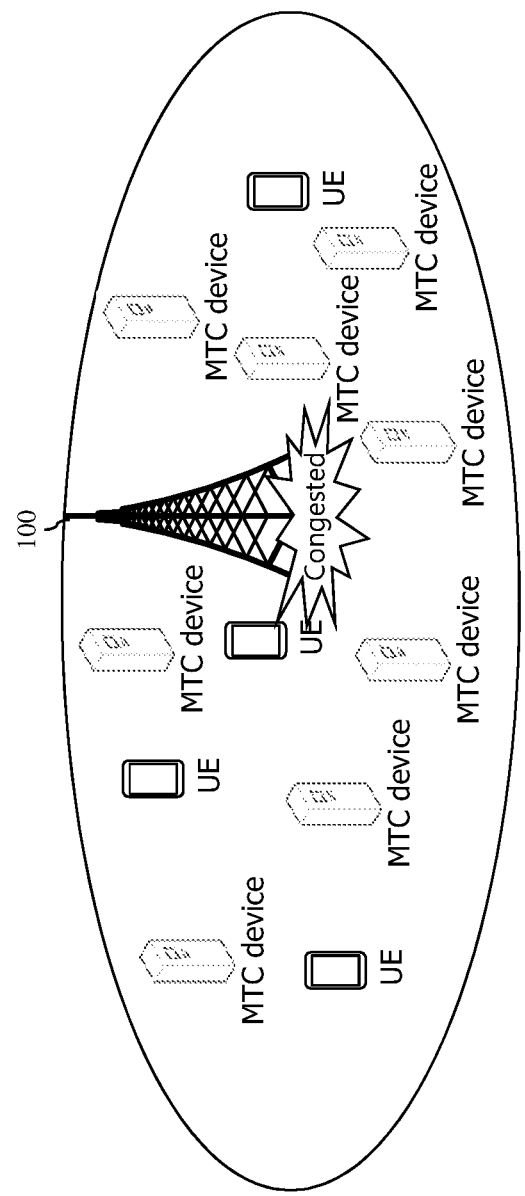
FIG. 9A illustrates an example in which network congestion is aggravated by MTC devices.

FIG. 9A illustrates an example in which network congestion is aggravated by MTC devices.

As can be seen from FIG. 9A, numerous MTC devices may be disposed within coverage of an eNodeB. Thus, network congestion may be further aggravated.

FIG. 9B illustrates an example of applying extended access barring to resolve congestion caused by MTC devices.

As illustrated in FIG. 9B, an MTC device is configured to have low priority. Also, in order to resolve congestion caused by the MTC device, the eNodeB broadcasts system information including EAB information.

Also, the eNodeB includes configuration information regarding whether a specific MTC device should apply EAB, i.e., EAB configuration information, in a NAS configuration management object (MO) and transfers the same to the specific MTC device. When the low priority and EAB are set, a NAS layer of the MTC device informs an RRC layer about an indication regarding whether EAB is applied with respect to a corresponding service request (Attach, Tracking Area Update, Service Request, etc.), excluding a case corresponding to an emergency call, mobile terminated (MT) access, or a high priority access class (e.g., AC 11-15), and the RRC layer controls access by applying EAB when performing an RRC connection establishment procedure with respect to the corresponding request with the indication to apply EAB.

Thus, as illustrated, when an application layer APP of the MTC device 100 informs the NAS layer that data transmission is required, the NAS layer determines to apply EAB on the basis of EAB configuration. Also, the application layer APP delivers a service request to the RRC layer. Here, indication to apply EAB is also delivered together with the service request.

The RRC layer of the MTC device determines whether the service request is subject to apply EAB based on the indication to apply EAB. If EAB is applied, transmission of the RRC connection request message by the RRC layer is barred (or inhibited).

Figure 10:
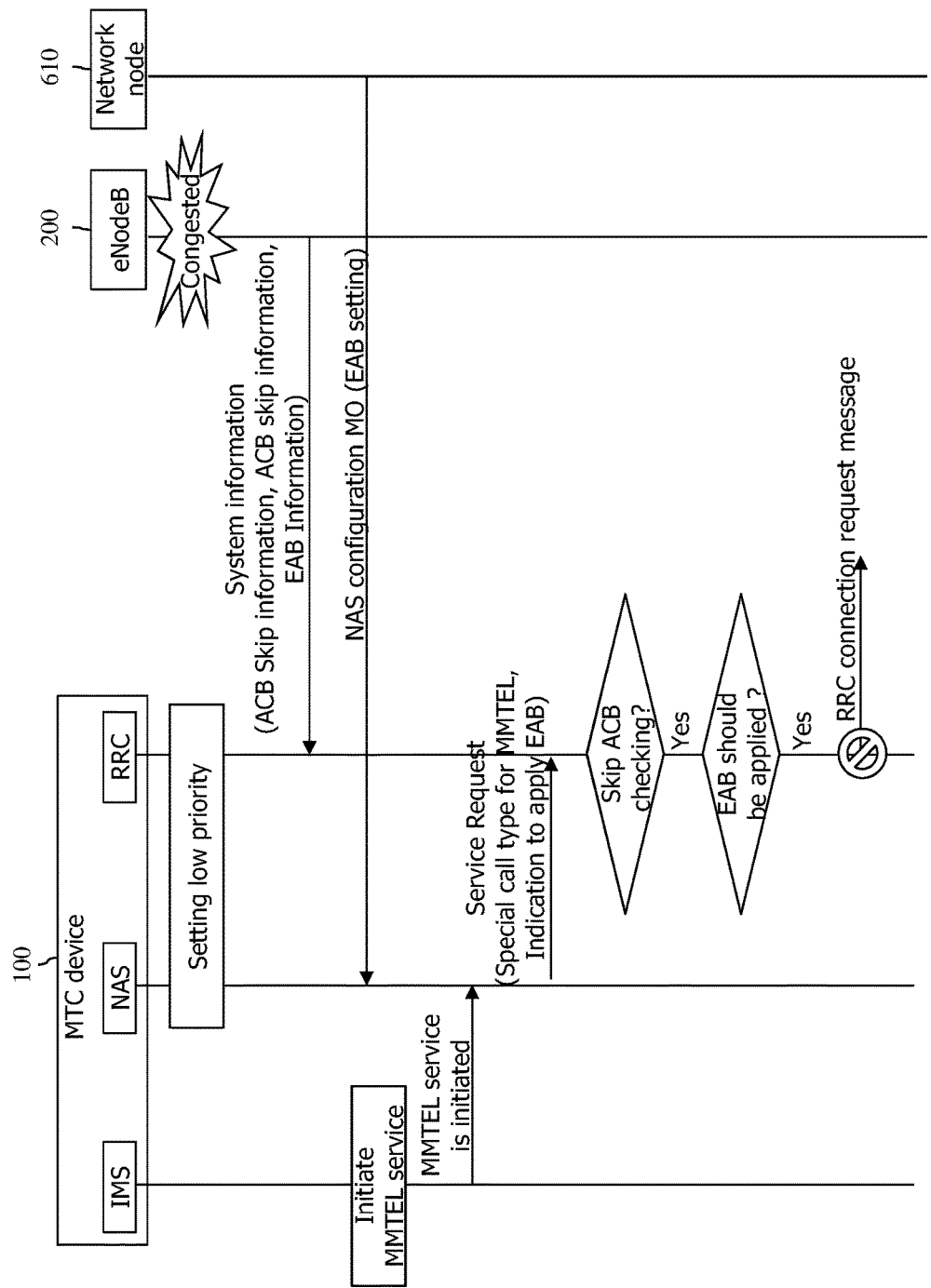
FIG. 10 illustrates technical ambiguity between skipping ACB checking and applying EAB or a problem that an MMTEL service is barred in a worst-case scenario, when an MTC device performs the MMTEL service.

FIG. 10 illustrates technical ambiguity between skipping ACB checking and applying EAB or a problem that an MMTEL service is barred in a worst-case scenario, when an MTC device performs the MMTEL service.

Recently, smart vehicles have been emerged as a utilization example of an MTC device. A smart vehicle may be equipped with a camera to transmit and receive video data. Thus, it is required to perform an MMTEL service in an MTC device.

Thus, as illustrated in FIG. 10, the eNodeB may provide ACB information and ACB skip information for an MMTEL service to the MTC device. Also, the eNodeB provides EAB information to the MTC device. Here, the MTC device is configured to have low priority. The ACB information and the ACB skip information are delivered to the RRC layer of the MTC device through a system information block (SIB) type 2. Also, the EAB information is delivered to the RRC layer of the MTC device through an SIB type 14.

Also, the eNodeB includes configuration information regarding whether the MTC device should apply EAB, i.e., EAB configuration information, in a NAS configuration management object (MO) and transfers the same to the MTC device.

Here, when the ACB skip information and the EAB configuration information are simultaneously provided to the MTC device, it is technically obscure as to whether only any one of the two is to be applied.

If both are applied, a problem in which an RRC connection establishment procedure for the MMTEL service is barred may arise. This may be described in detail as follows. When the application (APP) layer of the MTC device determines to start an MMTEL service, the APP layer informs the NAS layer that the MMTEL service starts. The NAS layer determines to perform a service request procedure or a TAU procedure on the basis of the indication. Here, the NAS layer sets a special call type for MMTEL within a service request message for the service request procedure or a TAU request message for the TAU procedure. Also, the NAS layer delivers an indication to apply EAB to the RRC layer. The RRC layer determines to skip ACB checking on the basis of the ACB skip information and the call type obtained from the NAS layer. However, since the NAS layer has indicated to apply EAB, the RRC layer applies EAB, and thus, transmission of an RRC connection request message is interrupted. Thus, although ACB checking is skipped, the MMTEL service cannot be smoothly performed due to the applying EAB.

<Present Disclosure>

The present disclosure proposes a method for solving the aforementioned problems.

In detail, the present disclosure provides an effective processing method for skipping ACB checking and applying EAB in cases where a network transfers all of ACB information, ACB skip information, and information to apply EAB to an RRC layer of an MTC device and configures low priority and EAB to the MTC device.

I. Proposal 1: NAS Layer-Based Solution

I-1. Proposal 1-1: Preferentially Applying EAB by NAS Layer

According to proposal 1-1, the NAS layer of the MTC device sets a general call type (e.g., originating call), rather than a special call type (e.g., originating MMTEL voice, originating MMTEL video, originating SMSoIP, originating SMS (for SMS generated by the NAS layer), as a call type in the service request procedure for the MMTEL service. This will be described with reference to FIGS. 11A and 11B hereinafter.

Figure 11A:
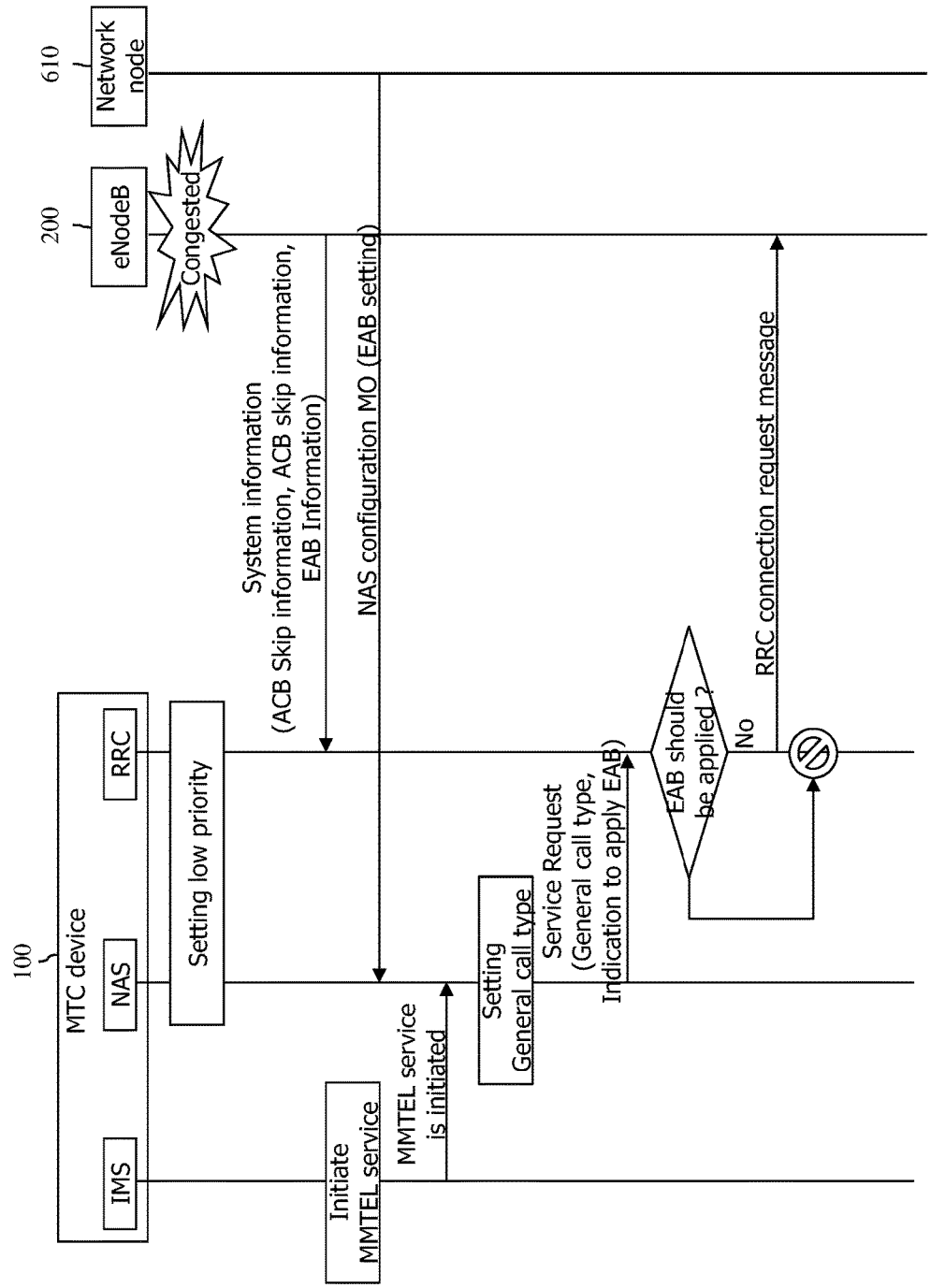

FIGS. 11A and 11B are flow charts illustrating the proposal 1-1.

First, FIG. 11A relates to originating MMTEL voice, originating MMTEL video, or originating SMS over IP (originating SMSoIP) among MMTEL services. Also, FIG. 11B relates to SMS over NAS (i.e., SMS generated by the NAS layer) among MMTEL services. FIGS. 11A and 11B are different only in types of MMTEL service, and thus, contents of FIGS. 11A and 11B will be described with respect to FIG. 11A hereinafter.

The eNodeB 200 may provide ACB information and ACB skip information for an MMTEL service to the MTC device 100. Also, the eNodeB 200 provides EAB information to the MTC device. Here, the MTC device is configured to have low priority. The ACB information and the ACB skip information are delivered to the RRC layer of the MTC device 100 through the SIB type 2. Also, the EAB information is delivered to the RRC layer of the MTC device 100 through the SIB type 14.

Also, a (mobile carrier) network node includes configuration information regarding whether EAB is to be applied, i.e., EAB configuration information, in a NAS configuration management object (MO) and transfers the same to the MTC device 100.

If an IMS layer, among application layers of the MTC device 100, determines to start an MMTEL service, the IMS layer delivers an indication indicating starting/setting of the MMTEL service to the NAS layer.

The NAS layer recognizes that EAB has been set. Also, the NAS layer recognizes that the service request procedure or the TAU procedure for the MMTEL service is required. Also, the NAS layer determines to perform the service request procedure or the TAU procedure. Here, on the basis of one or more of a provider policy, network setting, subscriber information, and capability information, or without based thereon, the NAS layer sets a call type within a service request message for the service request procedure or a GAU request message for the TAU procedure as a general call type (e.g., originating call), rather than a special call type (e.g., originating MMTEL voice, originating MMTEL video, or originating SMSoIP), ignoring the indication indicating starting/setting of the MMTEL service. That is, the NAS layer does not provide a special call type based on the indication indicating starting/setting of the MMTEL service to the RRC layer. Also, the NAS layer sets an RRC establishment cause to MO data or MO signaling. However, the NAS layer delivers an indication to apply EAB to the RRC layer.

According to the indication to apply EAB provided from the NAS layer, the RRC layer applies only EAB when performing RRC connection establishment procedure for the service request procedure or the TAU request procedure of the NAS layer. Here, since the call type received by the RRC layer from the NAS layer is the general call type (e.g., originating calls), the RRC layer cannot recognize whether it is for the MMTEL service or general data origination.

As a result, the RRC layer performs access control by applying only EAB, and thus, an RRC connection request procedure may be interrupted.

The contents of proposal 1-1 described above may be achieved by improving the following standard operations.

First, when the MMTEL service starts, the IMS layer, among the application layers, delivers an indication indicating starting/setting of the MMTEL service to the NAS layer. The indication may include an indication indicating that a MO MMTEL voice call starts, an indication indicating that a MO MMTEL video call starts, and an indication indicating that a MO SMS over IP starts.

In cases where a certain request having a call type set as originating signaling is barred and in cases where MO MMTEL voice, MO MMTEL video, and SMS over IP starts, the NAS layer requests transmission of SMS over NAS from the RRC layer. Also, when EAB has not been set, the NAS layer starts a TAU request procedure. Here, if EAB has not been set for an MTC device, a call type used in the TAU request procedure is set as a special call type.

In cases where the RRC layer informs that a certain request having a call type set as originating signaling has been barred and in cases where a request for a radio resource of a user plane and a service request is started by MO MMTEL voice, MO MMTEL video, or MO SMS over IP or in cases where a service request is started by SMS over NAS, a service request procedure starts. Here, if EAB is not set for the MTC device, a call type used in the service request procedure is set as a special call type.

Meanwhile, when EAB has been configured for the MTC device, the NAS layer of the MTC device may instruct the RRC layer to apply EAB, except for the following matters.

Case where the MTC device is configured to use anyone of AC11 to 15 among access classes Case where the MTC device responds to a paging signal Case where an RRC establishment cause is set as an emergency call Case where the MTC device is configured to ignore EAB and case where an indication instructing that EAB should be ignored is received from an upper layer Case where the MTC device is configured to ignore EAB and has a PDN connection established with EAB ignored Meanwhile, an RRC establishment cause set in a TAU request message and a call type may be improved as follows.

TABLE 4

| RRC establishment cause | Call type |
| --- | --- |
| In case where MO MMTEL voice, MO MMTEL video, MO SMS over IP, and MO SMS over NAS have not been requested and EAB has not been set, RRC establishment cause is set as MO signaling | originating signaling |
| In case where MO MMTEL voice starts and EAB has not been set, RRC establishment cause is set as MO signaling | originating MMTEL voice |
| In case where MO MMTEL video starts and EAB has not been established, RRC establishment cause is set as MO signaling | originating MMTEL video |
| In case where MO SMS over IP starts and EAB has not been set, RRC establishment cause is set as MO signaling | originating SMSoIP |
| MO SMS over NAS starts and EAB has not been set, RRC establishment cause is set as MO signaling | originating SMS |

TABLE 4-continued

| RRC establishment cause | Call type |
| --- | --- |
| In case where TAU request message includes low priority indication, MO MMTEL voice, MO MMTEL video, MO SMS over IP, and MO SMS over NAS have not been requested, and EAB has been set, RRC establishment cause is set as delay tolerant | originating signaling |
| In cases where MO MMTEL has started, TAU request message has low priority indication, and EAB has not been set, RRC establishment cause is set as MO signaling | originating MMTEL voice |
| In case where MO MMTEL video has started, TAU request message includes low priority indication, and EAB has not been set, RRC establishment cause is set as MO signaling | originating MMTEL video |
| In case where SMS over IP has started, TAU request message has low priority indication, and EAB has not been set, RRC establishment cause is set as MO signaling | originating SMSoIP |
| In case where SMS over NAS has started, TAU request message includes low priority indication, and EAB has not been set, RRC establishment cause is set as MO signaling | originating SMS |

Meanwhile, the RRC establishment causes and the call types set in the service request message may be improved as follows.

TABLE 5

| RRC establishment cause | Call type |
| --- | --- |
| In case where MO MMTEL voice, MO MMTEL video, and MO SMS over IP have not started and EAB has been set, RRC establishment cause is set as MO data | originating calls |
| In case where MO MMTEL voice has started and EAB has not been set, RRC establishment cause is set as MO data | originating MMTEL voice |
| In case where MO MMTEL video has started and EAB has not been set, RRC establishment cause is set as MO data | originating MMTEL video |
| In case where SMS over IP has started and EAB has not been set, RRC establishment cause is set as MO data | originating SMSoIP |
| In case where SMS over NAS has started and EAB has not been set, RRC establishment cause is set as MO data | originating SMS |
| In case where low priority has been configured for NAS signaling, MO MMTEL voice, MO MMTEL video, MO SMS over IP, and MO SMS over NAS have not been requested, and EAB has been set, RRC establishment cause is set as delay tolerant | originating calls |
| In case where MO MMTEL voice has started, low priority has been configured for NAS signaling, and EAB has not been set, RRC establishment cause is set as MO data | originating MMTEL voice |
| In cases where MO MMTEL video has started, low priority has been configured for NAS signaling, and EAB has not been set, RRC establishment cause is set as MO data | originating MMTEL video |
| In cases where SMS over IP has started, low priority has been configured for NAS signaling, and EAB has not been set, RRC establishment cause is set as MO data | originating SMSoIP |
| In case where service request procedure has requested to request resource for downlink signaling for MO SMS over NAS, low priority has been configured for NAS signaling, and EAB has not been set, RRC establishment cause is set as MO data | originating SMS |
| In case where extended service request message includes low priority indication, MO MMTEL voice, MO MMTEL video, MO SMS over IP, and MO SMS over NAS have not been requested, and EAB has been set, RRC establishment cause is set as MO data | originating calls |
| In case where extended service request message includes low priority indication, MO MMTEL voice has started, and EAB has not been set, RRC establishment cause is set as MO data | originating MMTEL voice |
| In case where extended service request message includes low priority indication, MO MMTEL video has started, and EAB has not been set, RRC establishment cause is set as MO data | originating MMTEL video |
| In case where extended service request message includes low priority indication, MO SMS over IP has started, and EAB has not been set, RRC establishment cause is set as MO data | originating SMSoIP |
| In case where extended service request message includes low priority indication, MO SMS over NAS has started, and EAB has not been set, RRC establishment cause is set as MO data | originating SMS |
| In case where extended service request message includes low priority indication, MO MMTEL voice, MO MMTEL video, MO SMS over IP, and MO SMS over NAS have not been requested, and EAB has been established, RRC establishment cause is set as delay tolerant | originating calls |

TABLE 5-continued

| RRC establishment cause | Call type |
| --- | --- |
| In case where extended service request message includes low priority indication, MO MMTEL voice has started, and EAB has not been established, RRC establishment cause is set as MO data | originating MMTEL voice |
| In case where extended service request message includes low priority indication, MO MMTEL video has started, and EAB has not been established, RRC establishment cause is set as MO data | originating MMTELvideo |
| In case where extended service request message includes low priority indication, MO SMS over IP has started, and EAB has not been established, RRC establishment cause is set as MO data | originating SMSoIP |
| In case where extended service request message includes low priority indication, MO SMS over NAS has started, and EAB has not been established, RRC establishment cause is set as MO data | originating SMS |

I-2. Proposal 1-2: Preferentially Applying to Skip ACB Checking by NAS Layer

According to proposal 1-2, in cases where the MTC device wants to perform the MMTEL service in a state in which low priority has been set and EAB has been set, the NAS layer of the MTC device determines not to apply EAB and accordingly does not deliver an indication to apply EAB to the RRC layer or delivers an EAB skip indication to the RRC layer. This will be described with reference to FIGS. 12A and 12B hereinafter.

Figure 12A:
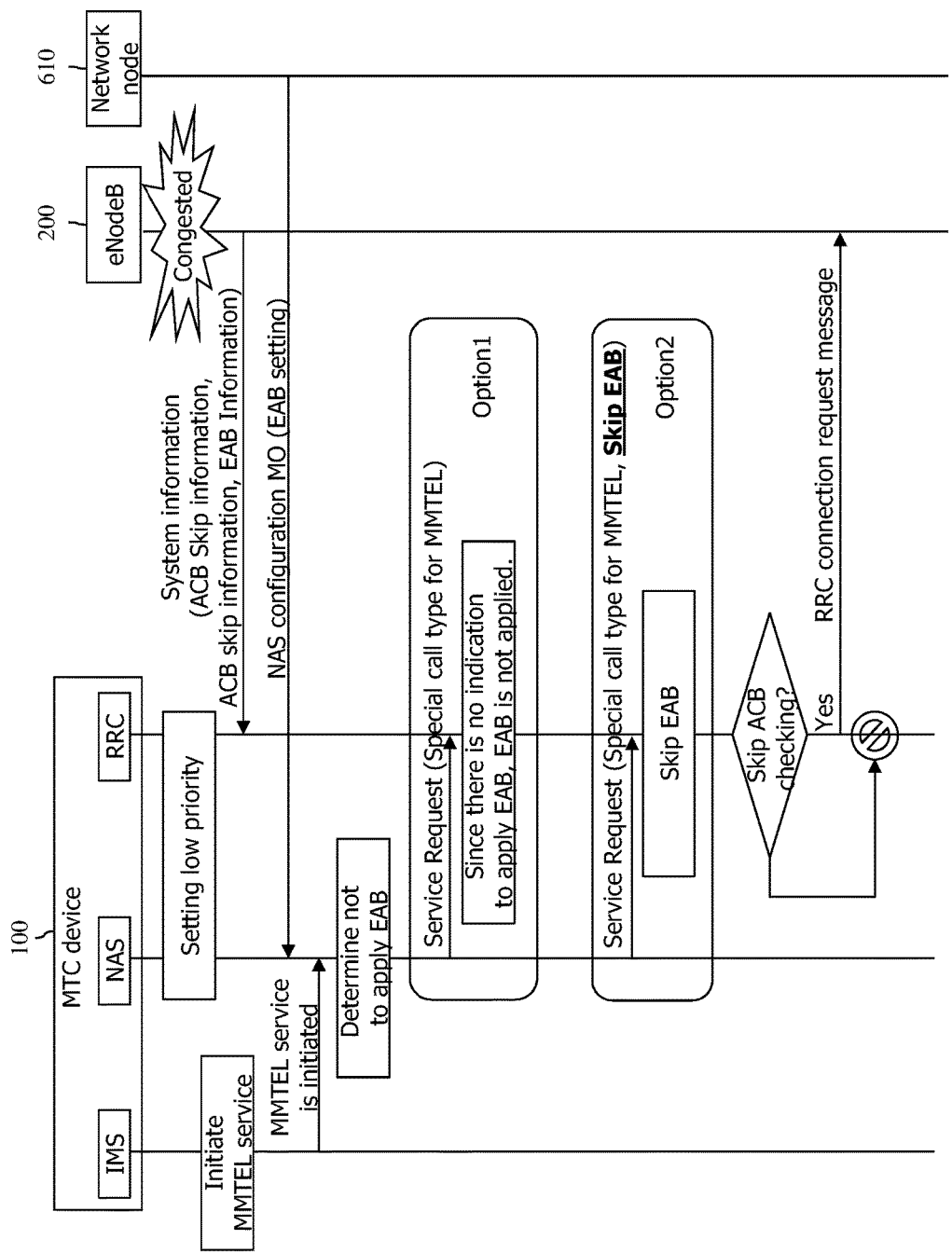
FIGS. 12A and 12B are flow charts illustrating a proposal 1-2.
Figure 12B:
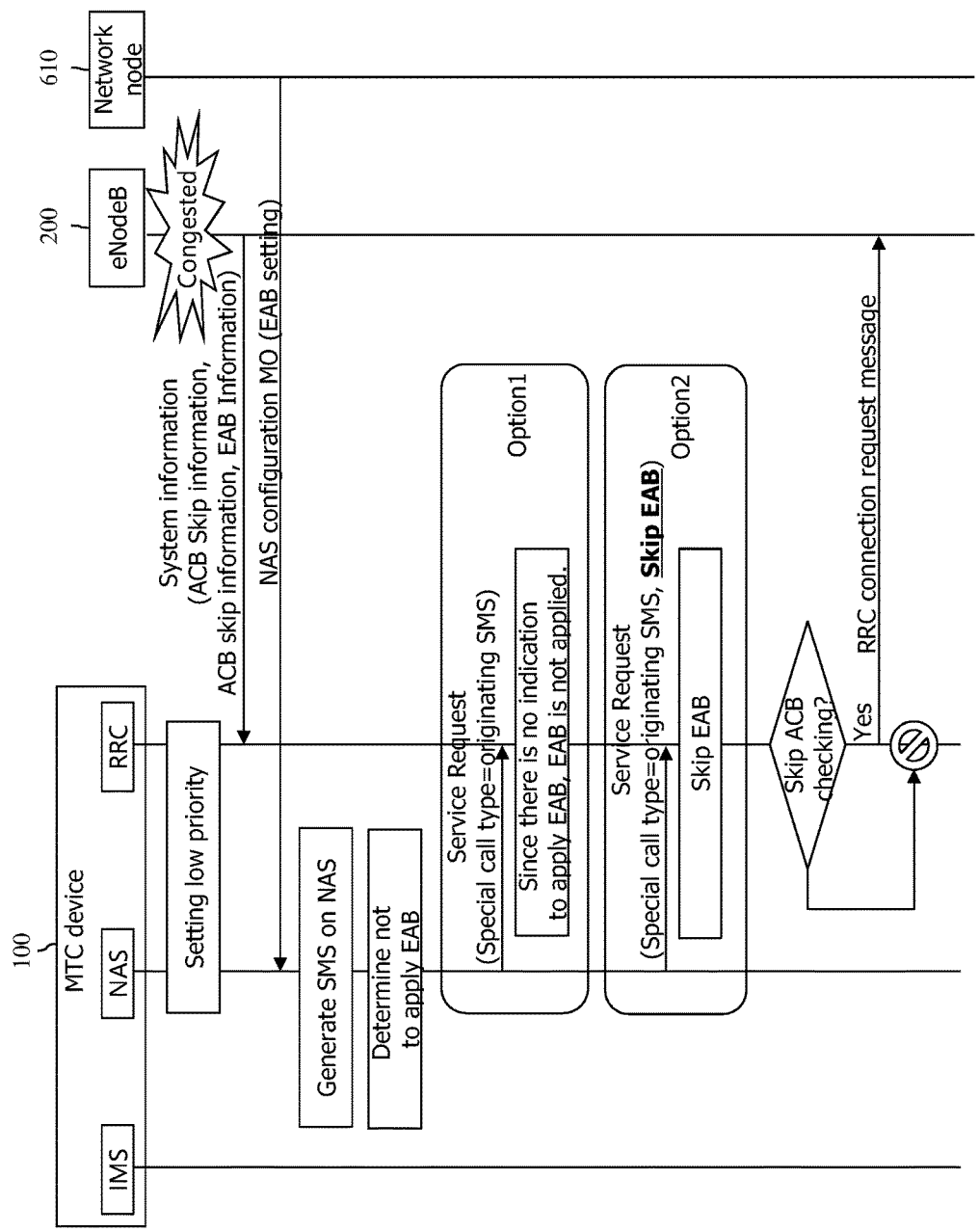

FIGS. 12A and 12B are flow charts illustrating the proposal 1-2.

First, FIG. 12A relates to originating MMTEL voice, originating MMTEL video, or originating SMS over IP (originating SMSoIP), among MMTEL services. Also, FIG. 12B relates to SMS over NAS (i.e., SMS generated by the NAS layer) among MMTEL services. FIGS. 12A and 12B are different only in types of MMTEL service, and thus, FIG. 12A will be described as a reference hereinafter.

The eNodeB 200 may provide ACB information and ACB skip information for an MMTEL service to the MTC device 100. Also, the eNodeB 200 provides EAB information to the MTC device. Here, the MTC device is set to have low priority. The ACB information and the ACB skip information are delivered to the RRC layer of the MTC device 100 through the SIB type 2. Also, the EAB information is delivered to the RRC layer of the MTC device 100 through the SIB type 14.

Also, a network node includes configuration information regarding whether EAB is to be applied, i.e., EAB configuration information, in a NAS configuration management object (MO) and transfers the same to the MTC device 100.

If an IMS layer, among application layers of the MTC device 100, determines to start an MMTEL service, the IMS layer delivers an indication indicating starting/setting of the MMTEL service to the NAS layer.

The NAS layer recognizes that EAB has been set. Also, the NAS layer recognizes that the service request procedure or the TAU procedure for the MMTEL service is required. Also, the NAS layer determines to perform the service request procedure or the TAU procedure. Here, on the basis of one or more of a provider policy, network setting, subscriber information, and capability information, or without based thereon, the NAS layer sets a call type within a service request message for the service request procedure or a GAU request message for the TAU procedure as a special call type (e.g., originating MMTEL voice, originating MMTEL video, or originating SMSoIP) according to the indication indicating starting/setting of the MMTEL service. That is, the NAS layer does not provide a special call type based on the indication indicating starting/setting of the MMTEL service to the RRC layer. Also, the NAS layer sets an RRC establishment cause to MO data or MO signaling.

However, the NAS layer determines not to apply EAB on the basis of the indication indicating starting/setting of the MMTEL service. Thus, the NAS layer may not provide the indication to apply EAB to the RRC layer like the illustrated option 1 or provide an EAB skip indication to the RRC layer like option 2.

Accordingly, the RRC layer does not apply EAB. Also, the RRC layer determines whether to skip ACB checking according to the ACB skip information received through the SIB from the eNodeB and the call type obtained from the NAS layer. Thus, since EAB is not applied and ACB checking is skipped, the RRC connection request procedure may be performed, rather than being barred.

The contents of proposal 1-2 described above may be achieved by improving the following standard operations.

First, when the MMTEL service starts, the IMS layer, among the application layers, delivers an indication indicating starting/setting of the MMTEL service to the NAS layer. The indication may include an indication indicating that a MO MMTEL voice call starts, an indication indicating that a MO MMTEL video call starts, and an indication indicating that a MO SMS over IP starts.

If EAB has been configured for the MTC device, the NAS layer of the MTC device may instruct the RRC layer to apply EAB, except for the following maters.

Case where the MTC device is configured to use anyone of AC11 to 15 among access classes Case where the MTC device responds to a paging signal Case where an RRC establishment cause is set as an emergency call Case where the MTC device is configured to ignore EAB and case where an indication instructing that EAB should be ignored is received from an upper layer Case where the MTC device is configured to ignore EAB and has a PDN connection established with EAB ignored Case where an indication indicating that one or more of MO MMTEL voice, MO MMEL video, and MO SMS over IP have started is received or a starting condition of MO SMS over IP is satisfied When upper layer request transmission of MO SMS over NAS That is, even after EAB is set, the MTC device receives an MMTEL voice, MMTEL video, and SMSoIP indication to an upper layer (e.g., IMS layer) or transmits SMS over NAS, an EAB indication is not provided to the AS layer.

Meanwhile, the RRC establishment causes and call types set in the TAU request message may be improved as follows.

TABLE 6

| RRC establishment cause | Call type |
| --- | --- |
| In case where MTC device does not have PDN connection established for emergency bearer service, PD connection request message having a request type set as emergency is not initiated, and MO MMTEL voice has not started, RRC connection establishment cause is set to MO signaling | originating MMTEL voice |
| In case where MTC device does not have PDN connection established for emergency bearer service, PD connection request message having a request type set as emergency is not initiated, and MO MMTEL video has not started, RRC connection establishment cause is set to MO signaling | originating MMTEL video |
| In case where MTC device does not have PDN connection established for emergency bearer service, PD connection request message having a request type set as emergency is not initiated, and MO SMS over IP has not started, RRC connection establishment cause is set to MO signaling | originating SMSoIP |
| In case where MTC device does not have PDN connection established for emergency bearer service, PD connection request message having a request type set as emergency is not initiated, and MO SMS over NAS has not started, RRC connection establishment cause is set to MO signaling | originating SMS |
| In case where MTC device does not have PDN connection established for emergency bearer service, PD connection request message having a request type set as emergency is not initiated, MO MMTEL voice has started, and TAU request message includes low priority indication, RRC connection establishment cause is set to MO signaling | originating MMTEL voice |
| In case where MTC device does not have PDN connection established for emergency bearer service, PD connection request message having a request type set as emergency is not initiated, MO MMTEL video has started, and TAU request message includes low priority indication, RRC connection establishment cause is set to MO signaling | originating MMTEL video |
| In case where MTC device does not have PDN connection established for emergency bearer service, PD connection request message having a request type set as emergency is not initiated, MO SMS over IP has started, and TAU request message includes low priority indication, RRC connection establishment cause is set to MO signaling | originating SMSoIP |
| In case where MTC device does not have PDN connection established for emergency bearer service, PD connection request message having a request type set as emergency is not initiated, MO SMS over NAS has started, and TAU request message includes low priority indication, RRC connection establishment cause is set to MO signaling | originating SMS |

Meanwhile, the RRC establishment causes and call types set in the service request message may be improved as follows.

TABLE 7

| RRC establishment cause | Call type |
| --- | --- |
| In case where service request is for requesting radio resource of user plane and MO MMTEL voice has started, RRC connection establishment cause is set to MO data | originating MMTEL voice |
| In case where service request is for requesting radio resource of user plane and MO MMTEL video has started, RRC connection establishment cause is set to MO data | originating MMTEL video |
| In case where service request is for requesting radio resource of user plane and MO SMS over IP has started, RRC connection establishment cause is set to MO data | originating SMSoIP |
| In case where service request is for requesting radio resource of user plane and MO SMS over NAS has started, RRC connection establishment cause is set to MO data | originating SMS |
| In case where service request is for requesting radio resource of user plane, MO MMTEL voice has started, and low priority has been configured for NAS signaling, RRC connection establishment cause is set to MO data | originating MMTEL voice |
| In case where service request is for requesting radio resource of user plane, MO MMTEL video has started, and low priority has been configured for NAS signaling, RRC connection establishment cause is set to MO data | originating MMTEL video |
| In case where service request is for requesting radio resource of user plane, MO SMS over IP has started, and low priority has been configured for NAS signaling, RRC connection establishment cause is set to MO data | originating SMSoIP |

TABLE 7-continued

| RRC establishment cause | Call type |
|---|---|
| In case where service request is for requesting radio resource of user plane, MO SMS over NAS has started, and low priority has been configured for NAS signaling, RRC connection establishment cause is set to MO data | originating SMS |
| In case where extended service request includes indication indicating that low priority has not been set for NAS signaling and MO MMTEL voice has started, RRC connection establishment cause is set to MO data | originating MMTEL voice |
| In case where extended service request includes indication indicating that low priority has not been set for NAS signaling and MO MMTEL video has started, RRC connection establishment cause is set to MO data | originating MMTEL video |
| In case where extended service request includes indication indicating that low priority has not been set for NAS signaling and MO SMS over IP has started, RRC connection establishment cause is set to MO data | originating SMSoIP |
| In case where extended service request includes indication indicating that low priority has not been set for NAS signaling and MO SMS over NAS has started, RRC connection establishment cause is set to MO data | originating SMS |
| In case where extended service request includes indication indicating that low priority has been configured for NAS signaling and MO MMTEL voice has started, RRC connection establishment cause is set to MO data | originating MMTEL voice |
| In case where extended service request includes indication indicating that low priority has been configured for NAS signaling and MO MMTEL video has started, RRC connection establishment cause is set to MO data | originating MMTEL video |
| In case where extended service request includes indication indicating that low priority has been configured for NAS signaling and MO SMS over IP has started, RRC connection establishment cause is set to MO data | originating SMSoIP |
| In case where extended service request includes indication indicating that low priority has been configured for NAS signaling and MO SMS over NAS has started, RRC connection establishment cause is set to MO data | originating SMS |

II. Proposal 2: Solution to RRC Layer

II-1. Proposal 2-1: Preferentially Applying to EAB by RRC Layer

According to proposal 2-1, the RRC layer of the MTC device applies only EAB, ignoring the special call type (e.g., originating MMTEL voice, originating MMTEL video, originating SMSoIP, originating SMS (for SMS generated by the NAS layer) set for the service request procedure for the MMTEL service. This will be described with reference to FIGS. 13A and 13B hereinafter.

Figure 13A:
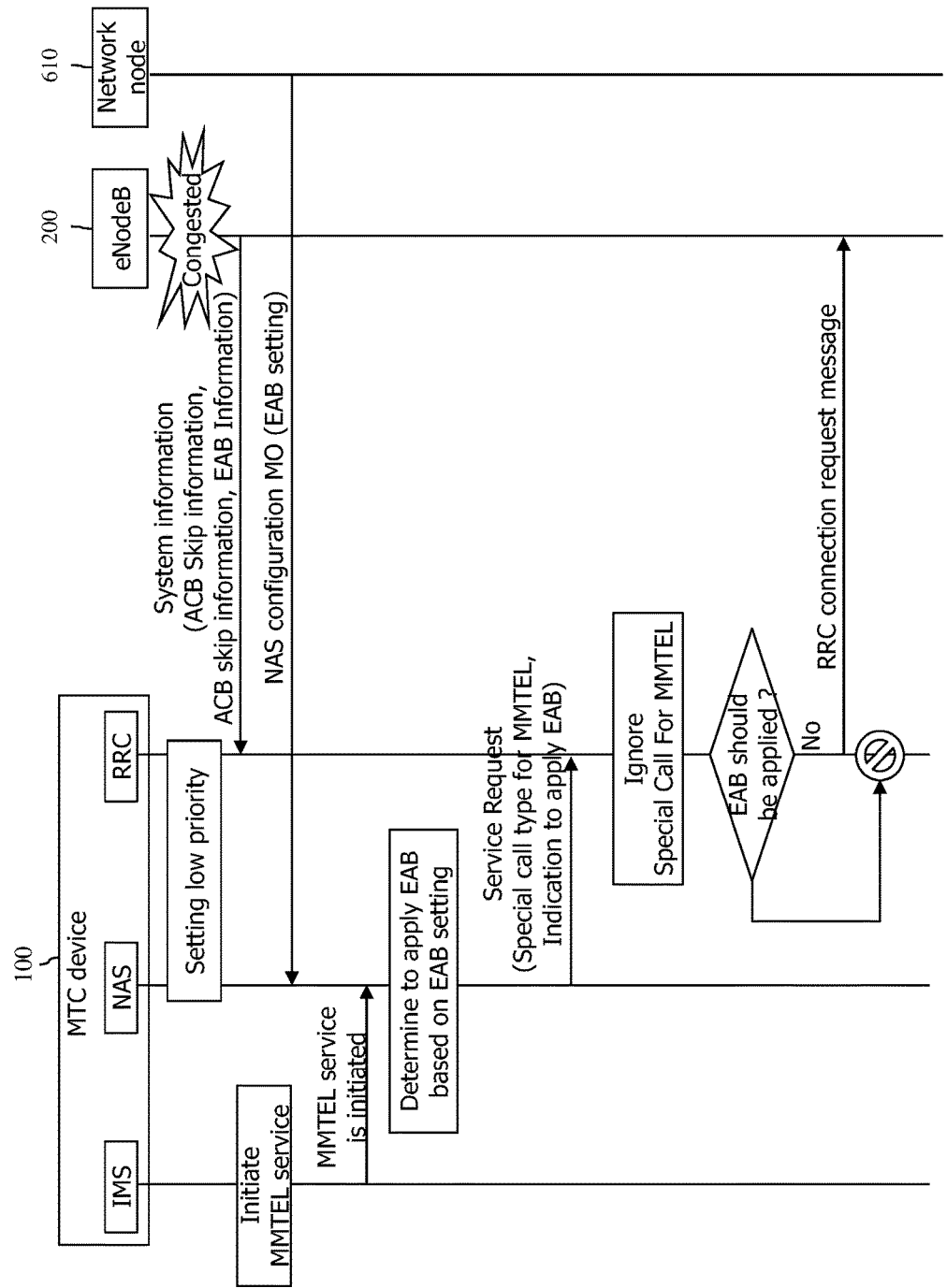
FIGS. 13A and 13B are flow charts illustrating a proposal 2-1.
Figure 13B:
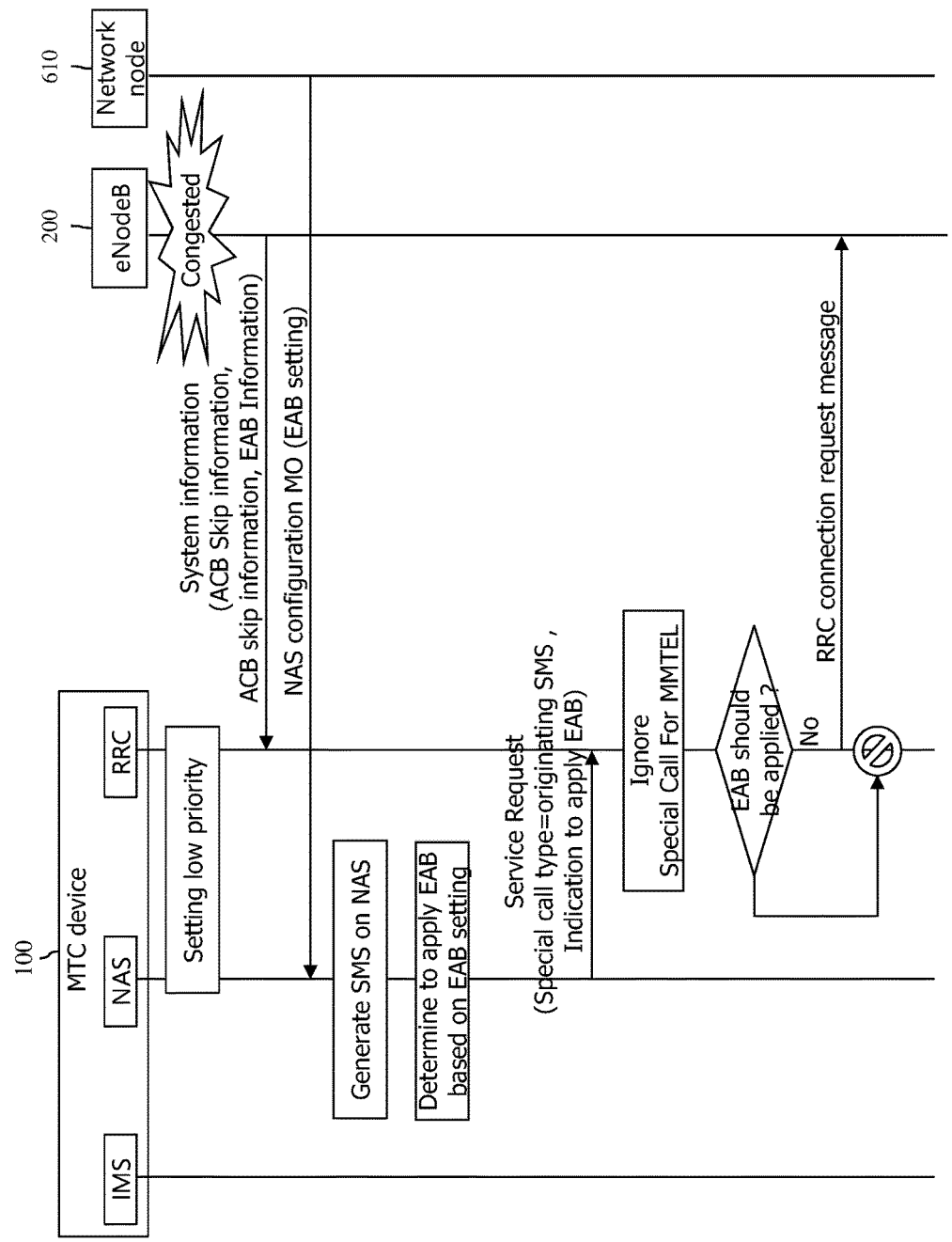

FIGS. 13A and 13B are flow charts illustrating the proposal 2-1.

First, FIG. 13A relates to originating MMTEL voice, originating MMTEL video, or originating SMS over IP (originating SMSoIP) among MMTEL services. Also, FIG. 13B relates to SMS over NAS (i.e., SMS generated by the NAS layer), among MMTEL services. FIGS. 13A and 13B are different only in types of MMTEL service, and thus, FIG. 13A will be described as a reference hereinafter.

The eNodeB 200 may provide ACB information and ACB skip information for an MMTEL service to the MTC device 100. Also, the eNodeB 200 provides EAB information to the MTC device. Here, the MTC device is set to have low priority. The ACB information and the ACB skip information are delivered to the RRC layer of the MTC device 100 through the SIB type 2. Also, the EAB information is delivered to the RRC layer of the MTC device 100 through the SIB type 14.

Also, a network node includes configuration information regarding whether EAB is to be applied, i.e., EAB configuration information, in a NAS configuration management object (MO) and transfers the same to the MTC device 100.

If an IMS layer, among application layers of the MTC device 100, determines to start an MMTEL service, the IMS layer delivers an indication indicating starting/setting of the MMTEL service to the NAS layer.

The NAS layer of the MTC device layer recognizes that the service request procedure or the TAU procedure for the MMTEL service is required. Also, the NAS layer determines to perform the service request procedure or the TAU procedure.

Also, on the basis of one or more of a provider policy, network setting, subscriber information, and capability information, or without based thereon, the NAS layer sets a call type within a service request message for the service request procedure or a GAU request message for the TAU procedure as a special call type (e.g., originating MMTEL voice, originating MMTEL video, or originating SMSoIP) according to the indication indicating starting/setting of the MMTEL service. That is, the NAS layer does not provide a special call type based on the indication indicating starting/setting of the MMTEL service to the RRC layer. Also, the NAS layer sets an RRC establishment cause to MO data or MO signaling.

Also, the NAS layer determines to apply EAB on the basis of EAB configuration. Also, the NAS layer delivers an indication to apply EAB to the RRC layer.

On the basis of one or more of a provider policy, network configuration, subscriber information, and capability information or without based thereon, the RRC layer applies only EAB, when performing RRC connection establishment procedure for the service request procedure or the TAU request procedure of the NAS layer according to indication to apply EAB provided from the NAS layer. To this end, the RRC layer ignores the call type received from the NAS layer. Thus, the RRC layer uses a general call type (e.g., originating calls), instead of the special call type. Accordingly, skipping ACB checking is not applied and only EAB is applied.

The contents of the proposal 2-1 described so far may be achieved by improving the following standard operations.

In cases where RRC connection is being established for MO MMTEL voice, MO MMTEL video, MO SMS over IP, or MO SMS over NAS and the NAS layer indicates that the RRC connection is subject to applying an EAB, the RRC layer performs checking on EAB. When RRC connection is barred according to EAB checking, failure of establishment of RRC connection is informed to an upper layer (e.g., the NAS layer).

II-2. Proposal 2-2: Preferentially Applying to Skip ACB Checking by RRC Layer

According to the proposal 2-2, although the NAS layer of the MTC device delivers an indication to apply EAB to the RRC layer, the RRC layer skips ACB checking, ignoring the indication to apply EAB. This will be described with reference to FIGS. 14A and 14B.

Figure 14A:
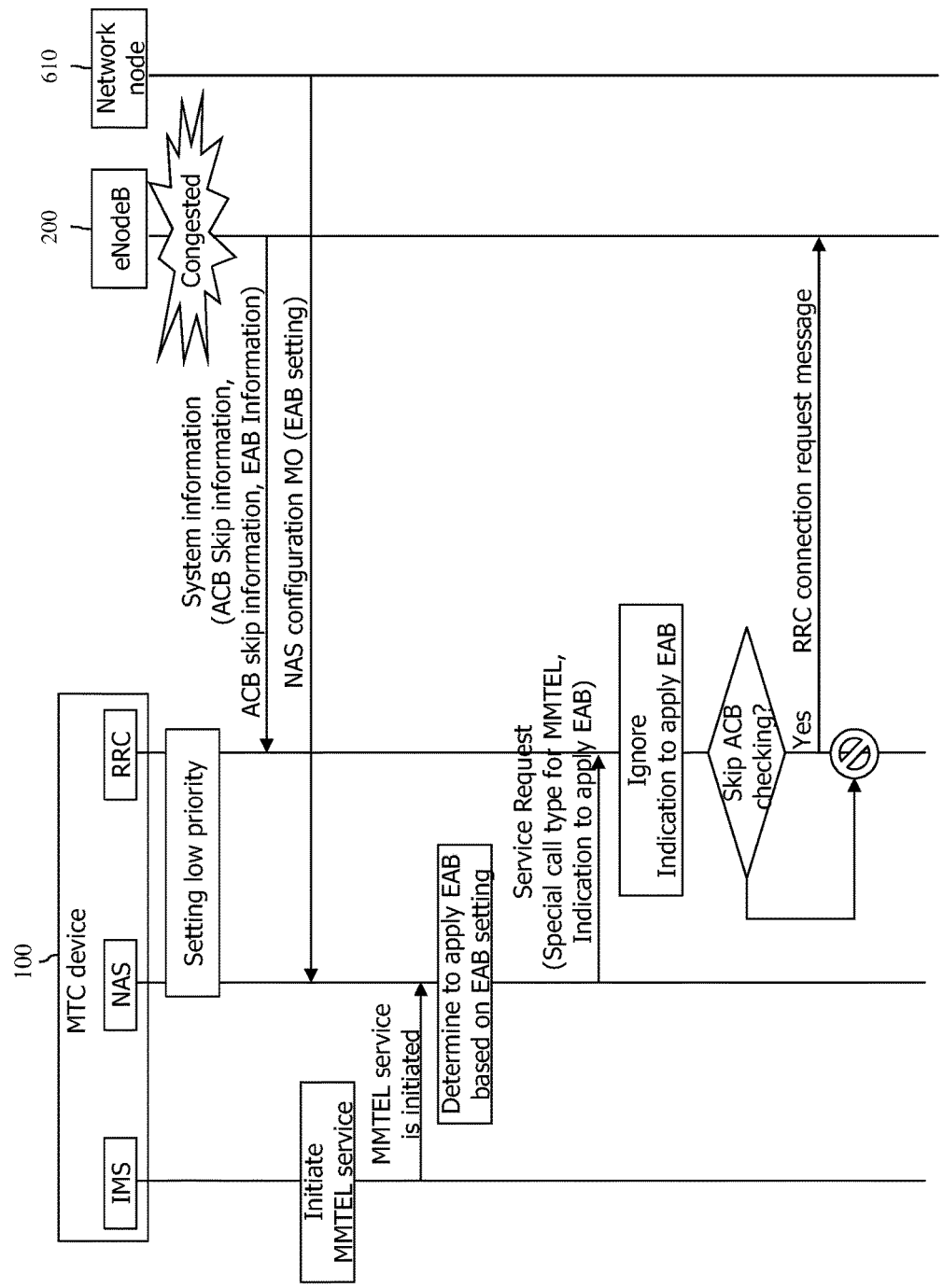
FIGS. 14A and 14B are flow charts illustrating a proposal 2-2.
Figure 14B:
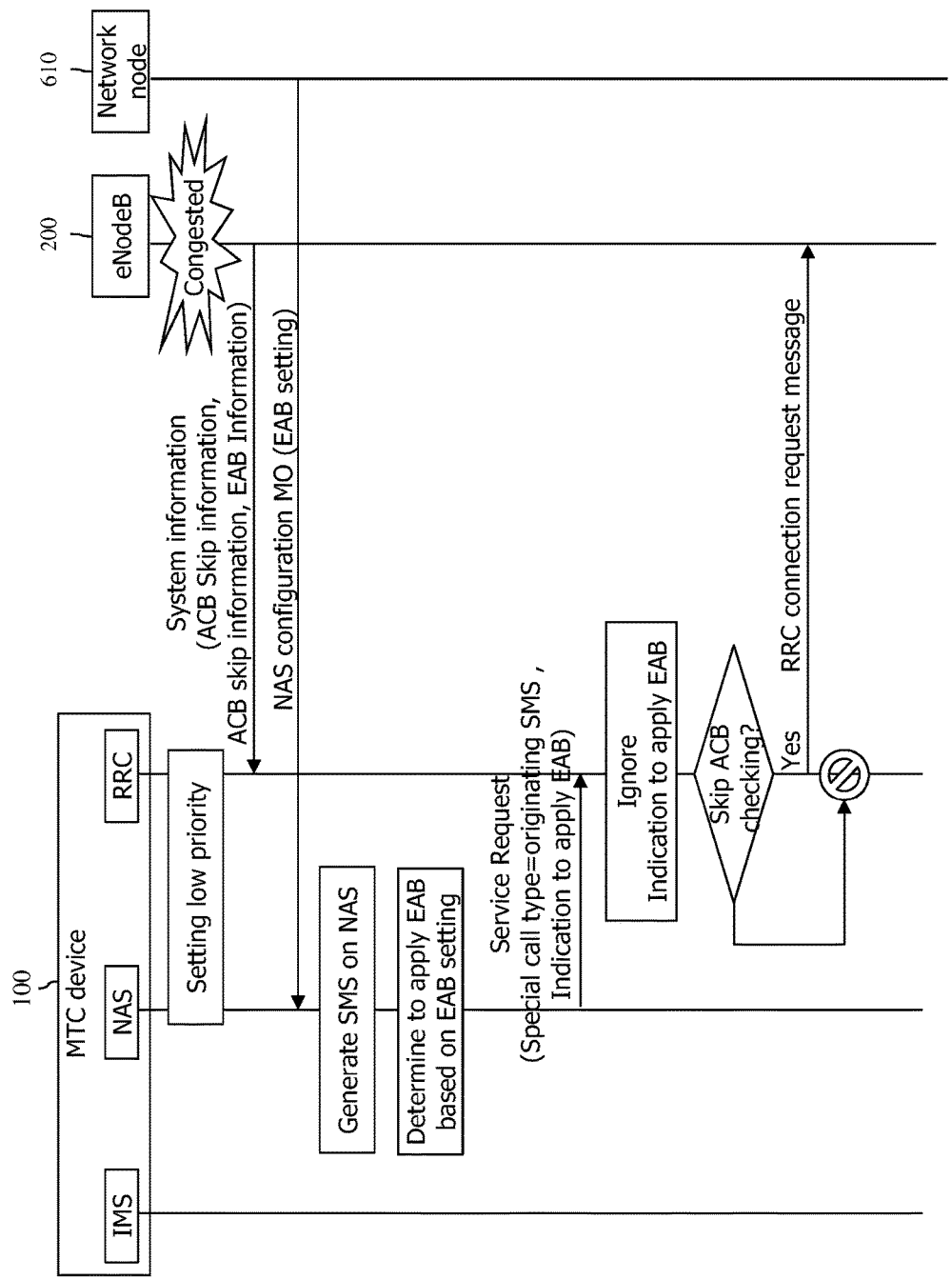

FIGS. 14A and 14B are flow charts illustrating the proposal 2-2.

First, FIG. 14A relates to originating MMTEL voice, originating MMTEL video, or originating SMS over IP (originating SMSoIP) among MMTEL services. Also, FIG. 14B relates to SMS over NAS (i.e., SMS generated by the NAS layer), among MMTEL services. FIGS. 14A and 14B are different only in types of MMTEL service, and thus, FIG. 14A will be described as a reference hereinafter.

The eNodeB 200 may provide ACB information and ACB skip information for an MMTEL service to the MTC device 100. Also, the eNodeB 200 provides EAB information to the MTC device. Here, the MTC device is set to have low priority. The ACB information and the ACB skip information are delivered to the RRC layer of the MTC device 100 through the SIB type 2. Also, the EAB information is delivered to the RRC layer of the MTC device 100 through the SIB type 14.

Also, a network node includes configuration information regarding whether EAB is to be applied, i.e., EAB configuration information, in a NAS configuration management object (MO) and transfers the same to the MTC device 100.

If an IMS layer, among application layers of the MTC device 100, determines to start an MMTEL service, the IMS layer delivers an indication indicating starting/setting of the MMTEL service to the NAS layer.

The NAS layer of the MTC device layer recognizes that the service request procedure or the TAU procedure for the MMTEL service is required. Also, the NAS layer determines to perform the service request procedure or the TAU procedure.

Also, on the basis of one or more of a provider policy, network setting, subscriber information, and capability information, or without based thereon, the NAS layer sets a call type within a service request message for the service request procedure or a GAU request message for the TAU procedure as a special call type (e.g., originating MMTEL voice, originating MMTEL video, or originating SMSoIP) according to the indication indicating starting/setting of the MMTEL service. That is, the NAS layer does not provide a special call type based on the indication indicating starting/setting of the MMTEL service to the RRC layer. Also, the NAS layer sets an RRC establishment cause to MO data or MO signaling.

Also, the NAS layer determines to apply EAB on the basis of EAB configuration. Also, the NAS layer delivers an indication to apply EAB to the RRC layer.

On the basis of one or more of a provider policy, network configuration, subscriber information, and capability information or without based thereon, the RRC layer ignores the indication to apply EAB provided from the NAS layer. Also, the RRC layer determines to skip ACB checking on the basis of the call type and the ACB skip information. For example, when the ACB skip information received from the eNodeB through an SIB is set to skip ACB regarding MMTEL voice, MMTEL video, SMS over IP, and SMS over NAS and the call type is set as a special call type for MMTEL, the RRC layer skips ACB checking. In this manner, since EAB is not applied and ACB checking is also skipped, the RRC connection request procedure may be performed, without being barred.

The contents of the proposal 2-2 described so far may be achieved by improving the following standard operations.

In cases where RRC connection is intended to be established for any one of MO MMTEL voice, MO MMTEL video, MO SMS over IP, and MO SMS over NAS and the NAS layer indicates that the RRC connection is subject to applying an EAB, the RRC layer ignores the indication indicating that the RRC connection is subject to applying of the EAB.

In cases where RRC connection is intended to be established for any one of MO MMTEL voice, MO MMTEL video, MO SMS over IP, and MO SMS over NAS and an SIB type 2 includes information indicating that ACB checking should be skipped for one of more of MO MMTEL voice, MO MMTEL video, MO SMS over IP, and MO SMS over NAS, the RRC layer regards that access to the cell is not barred.

III. Proposal 3: Method Based on Network

A network (e.g., eNodeB, MME, etc.) may provide only any one of ACB skip information and EAB to an MTC device on the basis of a provide policy, a network configuration, subscriber information, capability information of the MTC device, and the like.

The aforementioned proposals may be combined to be used.

The contents described above may be implemented by hardware. This will be described with reference to FIG. 15.

FIG. 15 is a block diagram illustrating a configuration of an MTC device 100 and an eNode B 200 according to an embodiment of the present invention.

As illustrated in FIG. 15, the MTC device 100 includes a storage unit 101, a controller 102, and a transceiver unit 103. Also, the eNodeB 200 includes a storage unit 201, a controller 202, and a transceiver unit 203.

The storage units 101 and 201 store the aforementioned method.

The controllers 102 and 202 control the storage units 101 and 201 and the transceiver units 103 and 203, respectively. In detail, the controllers 102 and 202 execute the methods stored in the storage units 101 and 201, respectively. Also, the controllers 102 and 202 transmit the aforementioned signals through the transceiver units 103 and 20e, respectively.

Embodiments of the present invention have been described, but the scope of the present invention is not limited to the specific embodiments set forth herein and may be variously modified and improved within the scope of the appended claims of the present invention.

What is claimed is:

1. A method for performing a multimedia telephony (MMTEL) service in a machine type communication (MTC) device, the MTC device including an IP multimedia subsystem (IMS) layer, a non-access stratum (NAS) layer, and a radio resource control (RRC) layer, the method comprising:

receiving, by the NAS layer, information representing that a mobile orienting (MO) MMTEL service has initiated;

setting, by the NAS layer, a call type for the MMTEL service in a call type field included in a request message for performing the MMTEL service; and transmitting, by the NAS layer, the request message to the RRC layer, wherein, when the MMTEL service has initiated and the MTC device has been configured with extended access barring (EAB), information to apply the EAB is not transmitted to the RRC layer; and skipping, by the RRC layer, EAB checking, when the call type for the MMTEL service is included in the request message received by the RRC layer and the information to apply the EAB is not received by the RRC layer.

2. The method of claim 1, further comprising:

receiving, by the NAS layer from a base station (BS), a management object (MO) including information representing that the EAB has to be configured.

3. The method of claim 1, further comprising:

receiving, by the RRC layer from a base station (BS), a system information block (SIB) including one or more of information for the EAB, access class barring (ACB) information, and ACB skip information.

4. The method of claim 3, further comprising:

after the EAB checking is skipped, determining, by the RRC layer, to skip ACB checking on the request message based on the call type for the MMTEL service and the ACB skip information.

5. A method for performing a multimedia telephony (MMTEL) service in a machine type communication (MTC) device, the MTC device including an IP multimedia subsystem (IMS) layer, a non-access stratum (NAS) layer, and a radio resource control (RRC) layer, the method comprising:

receiving, by the RRC layer from a base station (BS), a system information block including one or more of information for extended access barring (EAB), access class barring (ACB) information, and ACB skip information;

receiving, by the RRC layer from the NAS layer, a request message including a call type field set to a call type for the MMTEL service and information to apply the EAB;

when the information to apply the EAB is received by the RRC layer and the call type field has been set to the call type for the MMTEL service, ignoring, by the RRC layer, the information to apply the EAB;

skipping, by the RRC layer, EAB checking, when the information to apply the EAB is ignored; and after the EAB checking is skipped, determining, by the RRC layer, to skip ACB checking on the request message based on the call type for MMTEL service and the ACB skip information.

6. A machine type communication (MTC) device for performing a multimedia telephony (MMTEL) service, the MTC device comprising:

a transceiver; and a processor operatively connected to the transceiver and includes an IP multimedia subsystem (IMS) layer, a non-access stratum (NAS) layer, and a radio resource control (RRC) layer, wherein the NAS layer is configured to:
receive information representing that a mobile orienting (MO) MMTEL service has initiated from the IMS layer;
set a call type for the MMTEL service in a call type field included in a request message for performing the MMTEL service; and
transmit the request message to the RRC layer, wherein, when the MMTEL service has initiated and the MTC device has been configured with extended access barring (EAB), information to apply the EAB is not transmitted to the RRC layer, and wherein the RRC layer is configured to skip EAB checking, when the call type for the MMTEL service is included in the request message received by the RRC layer and the information to apply the EAB is not received by the RRC layer.

7. The MTC device of claim 6, wherein the NAS layer further performs:

receiving, from a base station (BS), a management object (MO) including information representing that the EAB has to be configured.

8. The MTC device of claim 6, wherein the RRC layer further performs:

receiving, from a base station (BS), a system information block (SIB) including one or more of information for the EAB, access class barring (ACB) information, and ACB skip information.

9. The MTC device of claim 6, wherein the RRC layer further performs:

after the EAB checking is skipped, determining to skip ACB checking based on the call type for the MMTEL service and the ACB skip information.

10. A machine type communication (MTC) device for performing a multimedia telephony (MMTEL) service, the MTC device comprising:

a transceiver; and a processor operatively connected to the transceiver unit and includes an IP multimedia subsystem (IMS) layer, a non-access stratum (NAS) layer, and a radio resource control (RRC) layer, wherein the RRC layer is configured to:
receive, from a base station (BS); a system information block including one or more of information for extended access barring (EAB), access class barring (ACB) information, and ACB skip information,
receive, from the NAS layer, a request message including a call type field set to a call type for the MMTEL service and information to apply the EAB;
when the information to apply the EAB is received by the RRC layer and the call type field has been set to the call type for the MMTEL service, ignore the information to apply EAB;
skip EAB checking, when the information to apply is ignored; and
after the EAB checking is skipped, determine to skip ACB checking based on the call type for MMTEL service and the ACB skip information.

11. The method of claim 1, further comprising:
when the MMTEL service has initiated and the MTC device has been configured with extended access barring (EAB), transmitting information representing that the EAB has to be skipped to the RRC layer.

12. The method of claim 11, further comprising:
skipping, by the RRC layer, EAB checking, when the call type for the MMTEL service is included in the request message received by the RRC layer and the information representing that the EAB has to be skipped is received by the RRC layer.

13. The MTC device of claim 6, wherein, when the MMTEL service has initiated and the MTC device has been configured with extended access barring (EAB), information representing that the EAB has to be skipped is transmitted to the RRC layer.

14. The MTC device of claim 6, wherein the RRC layer further performs:
skipping EAB checking, when the call type for the MMTEL service is included in the request message received by the RRC layer and the information representing that the EAB has to be skipped is received by the RRC layer.

15. The method of claim 1, further comprising:
transmitting a RRC connect message to a base station (BS) after skipping the EAB checking.

16. The method of claim 5, further comprising:
skipping the ACB checking based on the determining after the EAB checking is skipped; and
transmitting a RRC connect message to a base station (BS) after skipping the ACB.

17. The MTC device of claim 6, wherein the processor is configured to transmit a RRC connect message to a base station (BS) after skipping the EAB checking.

18. The MTC device of claim 10, wherein the processor is configured to:
skip the ACB checking based on the determining after the EAB checking is skipped; and
transmit a RRC connect message to a base station (BS) after skipping the ACB.

\* \* \* \* \*